United States Patent
Miklós et al.

(10) Patent No.: US 12,144,045 B2
(45) Date of Patent: Nov. 12, 2024

(54) METHODS PROVIDING DUAL CONNECTIVITY FOR REDUNDANT USER PLANE PATHS AND RELATED NETWORK NODES

(71) Applicant: Telefonaktiebolaget LM Ericsson (publ), Stockholm (SE)

(72) Inventors: György Miklós, Pilisborosjenö (HU); János Farkas, Kecskemét (HU); Joachim Sachs, Sollentuna (SE); Balázs Varga, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/895,332

(22) Filed: Aug. 25, 2022

(65) Prior Publication Data

US 2023/0007715 A1 Jan. 5, 2023

Related U.S. Application Data

(63) Continuation of application No. 16/957,151, filed as application No. PCT/IB2017/058517 on Dec. 29, 2017, now Pat. No. 11,477,833.

(51) Int. Cl.
*H04W 4/00* (2018.01)
*H04W 76/15* (2018.01)
(Continued)

(52) U.S. Cl.
CPC .......... *H04W 76/15* (2018.02); *H04W 76/25* (2018.02); *H04W 92/10* (2013.01)

(58) Field of Classification Search
CPC ..... H04W 76/15; H04W 76/25; H04W 92/10; H04W 4/70; H04W 4/02
See application file for complete search history.

(56) References Cited

U.S. PATENT DOCUMENTS

2011/0131332 A1 6/2011 Bouazizi
2014/0169269 A1 6/2014 Salot et al.
(Continued)

FOREIGN PATENT DOCUMENTS

CN 103797743 A 5/2014
CN 105027516 A 11/2015
(Continued)

OTHER PUBLICATIONS

Chinese Search Report, CN Application No. 20178009807236, mailed Dec. 30, 2022, 9 pages.
(Continued)

*Primary Examiner* — Omoniyi Obayanju
(74) *Attorney, Agent, or Firm* — Sage Patent Group

(57) ABSTRACT

A method may be performed by a network entity of a wireless communication network. A first PDU session may be established for a wireless terminal (UE) using a first NodeB base station (MgNB) and a first user plane function entity (UPF1). A second PDU session may be established for the wireless terminal (UE) using a second NodeB base station (SgNB) and a second user plane function entity (UPF2). The first and second PDU sessions may be established for the wireless terminal (UE) using the first and second NodeB base stations so that the first and second PDU sessions are provided concurrently using dual connectivity DC to provide redundant data paths for communication of data for the wireless terminal (UE) through the wireless communication network.

20 Claims, 20 Drawing Sheets

(51) Int. Cl.
*H04W 76/25* (2018.01)
*H04W 92/10* (2009.01)

(56) References Cited

U.S. PATENT DOCUMENTS

| | | | |
|---|---|---|---|
| 2015/0016347 A1 | 1/2015 | Barclay et al. | |
| 2017/0339609 A1 | 11/2017 | Youn et al. | |
| 2017/0366618 A1 | 12/2017 | Vrzic et al. | |
| 2018/0199315 A1* | 7/2018 | Hong | H04L 5/00 |
| 2019/0274178 A1* | 9/2019 | Salkintzis | H04W 12/03 |
| 2020/0077320 A1 | 3/2020 | Shimoda et al. | |
| 2020/0178196 A1* | 6/2020 | Wang | H04W 48/18 |

FOREIGN PATENT DOCUMENTS

| | | |
|---|---|---|
| CN | 105940736 A | 9/2016 |
| RU | 2496277 C2 | 10/2013 |
| WO | 2017137075 A1 | 8/2017 |
| WO | 2017220124 A1 | 12/2017 |
| WO | 2018207001 A1 | 11/2018 |

OTHER PUBLICATIONS

International Search Report and Written Opinion of the International Searching Authority for PCT International Application No. PCT/IB2017/058517 dated Sep. 18, 2018.
ETSI GS NGP 008 V0.0.2, "Next Generation Protocols (NGP); Mobile Deterministic Networking," Group Specification, Nov. 2017, 16 pages.
3GPP TR 23.799 V14.0.0, "3rd Generation Partnership Project; Technical Specification Group Services and System Aspects; Study on Architecture for Next Generation System (Release 14)," Technical Report, Dec. 2016, 522 pages.
3GPP TS 23.501 V1.6.0, "3rd Generation Partnership Project; Technical Specification Group Services and System Aspects; System Architecture for the 5G System; Stage 2 (Release 15)," Technical Specification, Dec. 2017, 184 pages.
English translation of Office Action for Russian Patent Application No. 2020120952 dated Dec. 21, 2020.
3GPP TS 36.300, V14.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN)," Sep. 2017, Valbonne, France, 329 pages.
3GPP TS 23.502, V2.0.0, "3rd Generation Partnership Project; Technical Specification Group Services and System Aspects; Procedures for the 5G System," Dec. 2017, Valbonne, France, 260 pages.
3GPP TS 38.300, V2.0.0, "3rd Generation Partnership Project; Technical Specification Group Radio Access Network; NR; NR and NG-RAN Overall Description," Dec. 2017, Valbonne, France, 68 pages.
IEEE 802.1 Working Group, "The Time-Sensitive Networking Task Group," May 3, 2017, 4 pages.
IETF Datatracker, "Deterministic Networking (detnet)," (last accessed on May 26, 2022), 5 pages.
Search Report for Chinese Patent Application No. 2017800980726 dated Jan. 16, 2024, 2 pages.

* cited by examiner

Redundancy Based on Dual Connectivity

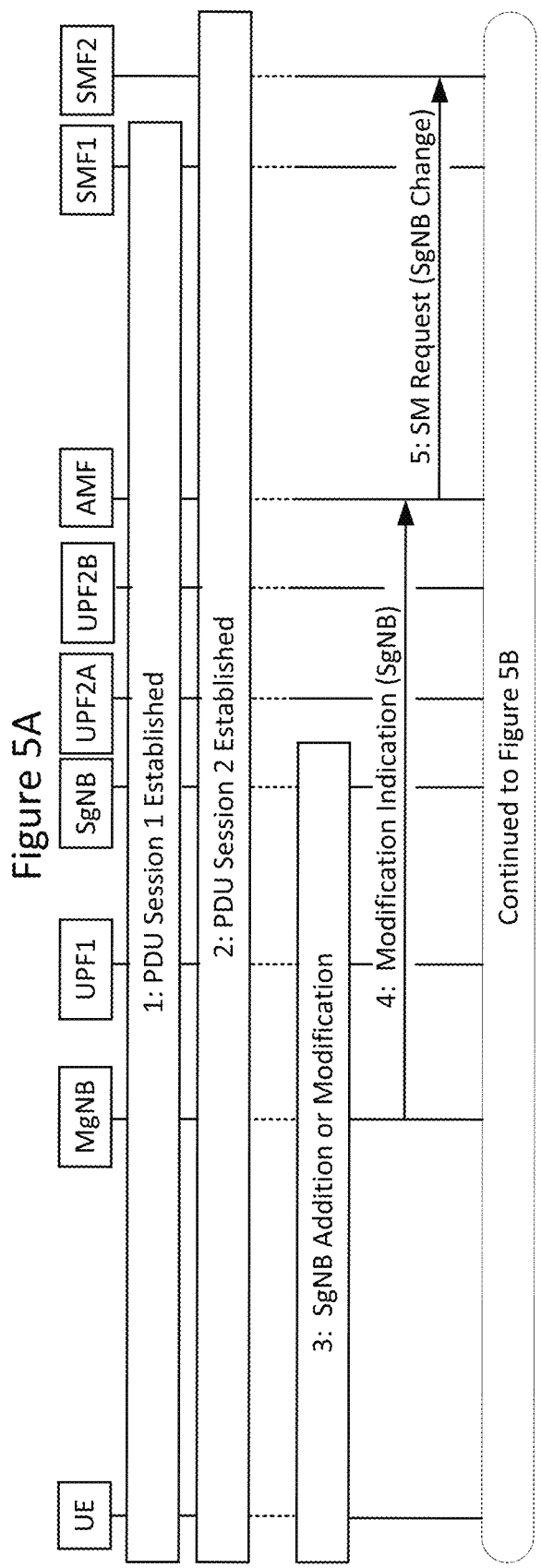

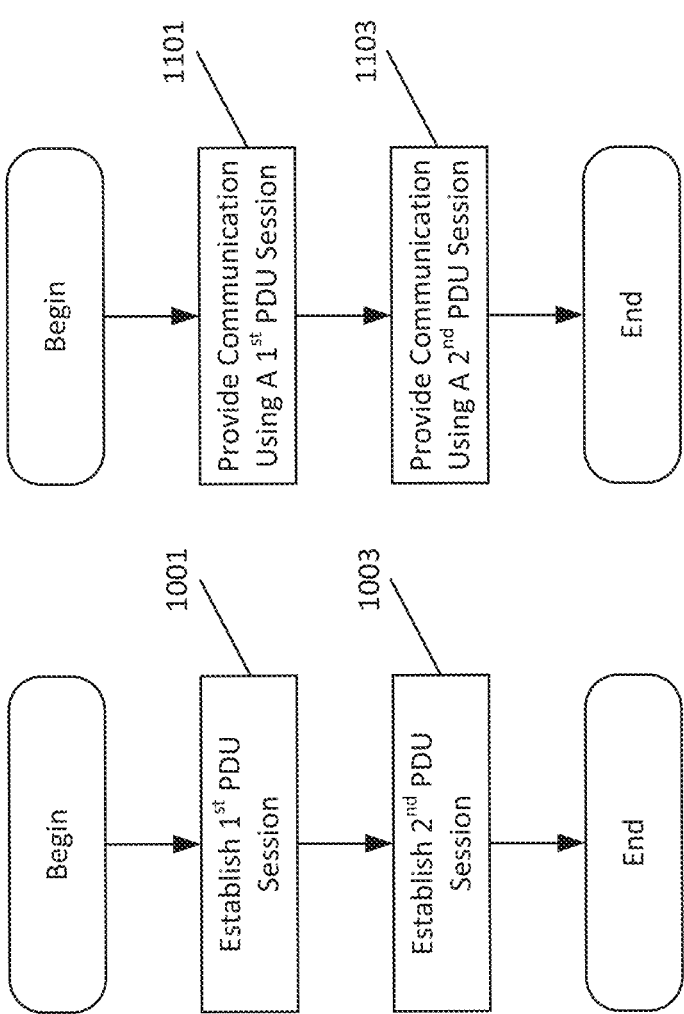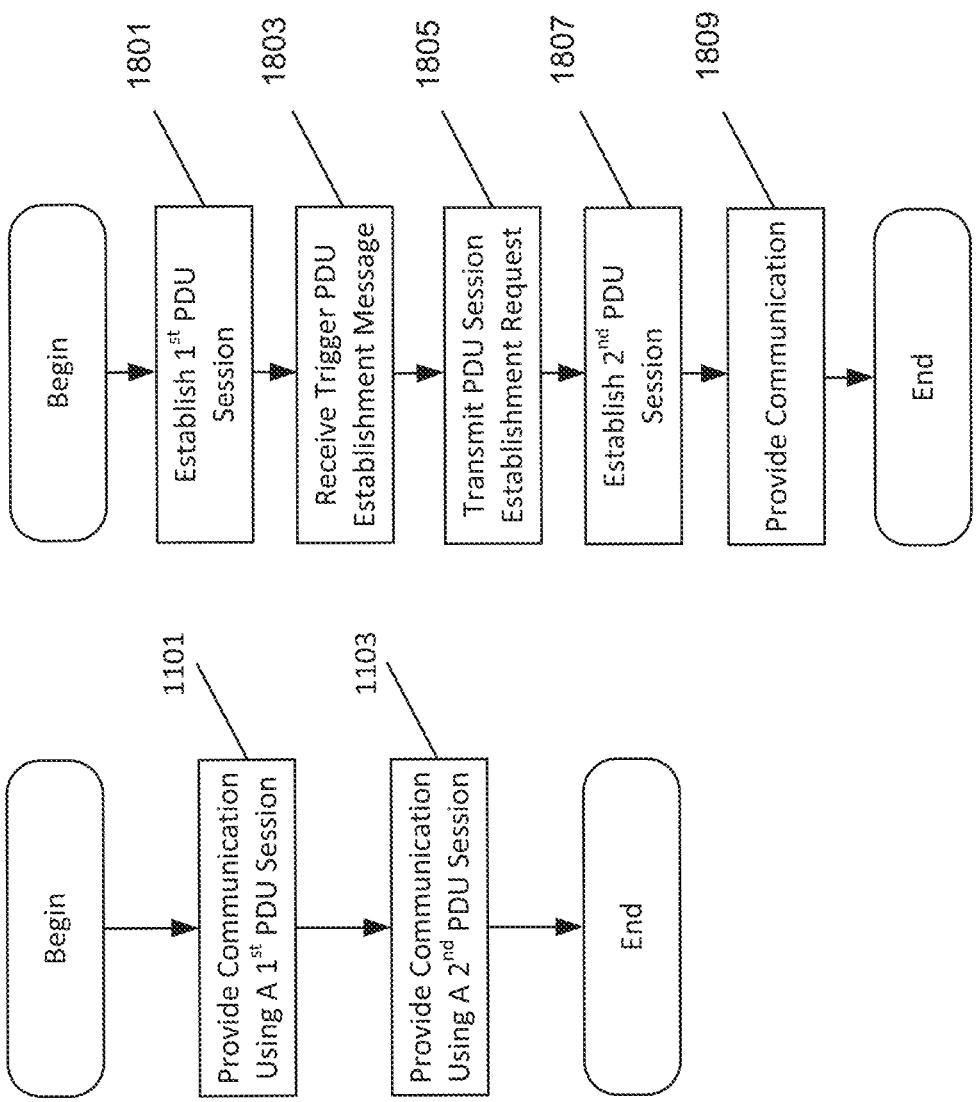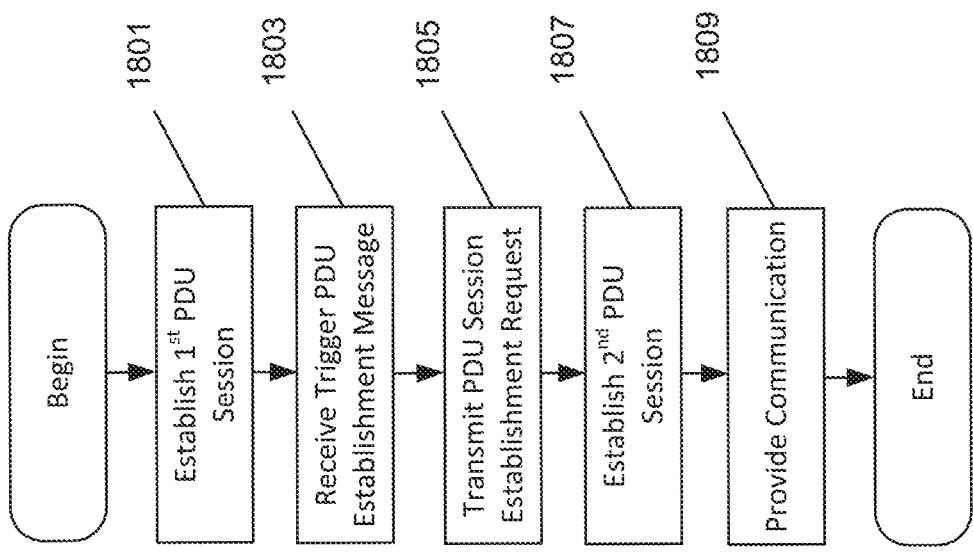

METHODS PROVIDING DUAL CONNECTIVITY FOR REDUNDANT USER PLANE PATHS AND RELATED NETWORK NODES

CROSS REFERENCE TO RELATED APPLICATIONS

This application is a continuation of U.S. patent application Ser. No. 16/957,151, filed on Jun. 23, 2020, which is a 35 U.S.C. § 371 national stage application of PCT International Application No. PCT/IB2017/058517 filed on Dec. 29, 2017, the disclosures and content of which are incorporated by reference herein in their entireties.

TECHNICAL FIELD

The present disclosure relates generally to communications, and more particularly to wireless communications and related communication nodes.

BACKGROUND

The fifth generation of mobile technology (5G) is positioned to provide a much wider range of services than the existing 3G/4G technologies. It is expected to enable a fully connected society, in which a rich set of Use Cases—some of them are still not yet conceptualized—will be supported from the Enhanced Mobile Broadband through media distribution, Massive Machine Type Communication (M-MTC) to the Mission Critical Services (Critical Machine Type Communication-C-MTC).

The C-MTC Use Case group covers a big set of applications, but most of them can be characterized by low latency and high reliability, as well as high availability. It should be mentioned that although the low latency is an important criterion in numerous Use Cases, high reliability is expected to be a basic requirement in a much wider range of services. For example, low latency and high reliability may be very important factors, for example, in Industry (Factory) Automation Use Cases (e.g., high speed motion control, packaging, printing, etc.), and several special subtasks of Smart Grid service. In the above Use Cases, the guarantees on latency and reliability requirements together may provide/guarantee sufficient service quality. However, high reliability is still important in such Use Cases, where relaxed requirements on latency (e.g. higher delay and/or higher jitter can be tolerated) may be allowed. Illustrative examples could include the following Use Cases, such as Intelligent Traffic Systems (ITS), remote control (with or without haptic feedback), robotized manufacturing, Smart Grid, Automated Guided Vehicles (AGVs), Drone Controlling, tele-surgery, etc. In these cases, extreme low latency may not be a crucial factor, but the high (and in some cases, the extreme high) reliability of the connectivity between the application server and the C-MTC device may be the most important requirement. In summary, reliability may be an important requirement for Use Cases with low latency requirements, but the reliability, in itself, could be a basic characteristic of C-MTC services.

Accordingly, there continues to exist a need for improved reliability in wireless communication networks.

SUMMARY

According to some embodiments of inventive concepts, a method may be performed by a network entity of a wireless communication network. A first PDU session for a wireless terminal may be communicated using a first NodeB base station and a first user plane function (UPF) entity. A second PDU session for the wireless terminal may be established using a second NodeB base station and a second UPF entity. Moreover, the first and second PDU sessions may be established for the wireless terminal using the first and second NodeB base stations so that the first and second PDU sessions are provided concurrently using dual connectivity DC to provide redundant data paths for communication of data for the wireless terminal through the wireless communication network.

According to some other embodiments of inventive concepts, a method may be provided to operate a wireless communication network including a first NodeB base station, a second NodeB base station, a first user plane function (UPF) entity, and a second UFP entity. Communication of a plurality of data frames for a wireless terminal may be provided using a first PDU session using the first NodeB base station and the first UPF entity. Communication of the plurality of data frames for the wireless terminal may also be provided using a second PDU session using the second NodeB base station and the second UPF entity so that the first and second PDU sessions provide redundant data paths for communication of the plurality of data frames using dual connectivity DC for the wireless terminal.

According to some embodiments of inventive concepts, independent user plane paths may thus be set up over the radio interface to provide redundancy. This may increase reliability of a communication, as communication may continue without any delay in case of single failures in the user plane. For example, in case of temporary radio link problems due to interference or loss of coverage on one path, the communication may continue on the other path, and/or a wired link in a fixed part of the network on one path may break but the communication may continue on the other path uninterrupted.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 5A, 5B, and 5C provide a message diagram illustrating network operations according to some embodiments of inventive concepts;

FIG. 10 is a flow chart illustrating operations of a network entity according to some embodiments of inventive concepts;

FIG. 11 is a flow chart illustrating operations of a radio access network according to some embodiments of inventive concepts;

FIG. 18 is a flow chart illustrating wireless terminal (UE) operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 7:
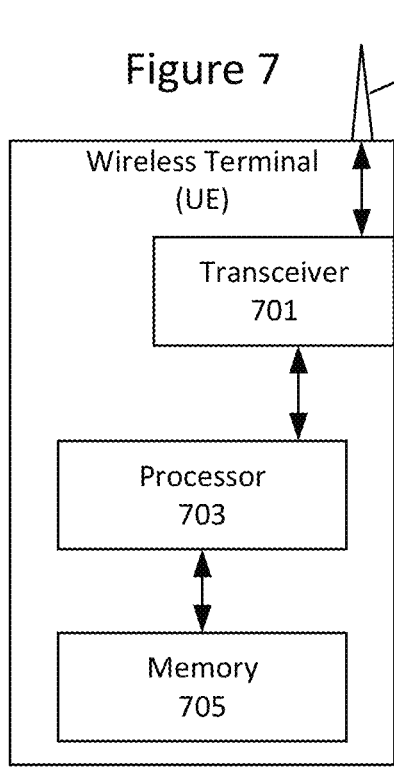
FIG. 7 is a block diagram illustrating a wireless terminal according to some embodiments of inventive concepts.

FIG. 7 is a block diagram illustrating elements of a mobile terminal UE (also referred to as a wireless device, a wireless communication device, a wireless terminal, a wireless communication terminal, user equipment, a user equipment node/terminal/device, etc.) configured to provide wireless communication according to embodiments of inventive concepts. As shown, mobile terminal UE may include an antenna 707, and a transceiver circuit 701 (also referred to as a transceiver) including a transmitter and a receiver configured to provide uplink and downlink radio communications with a base station(s) of a radio access network. Mobile terminal UE may also include a processor circuit 703 (also referred to as a processor) coupled to the transceiver circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required. Mobile terminal UE may also include an interface (such as a user interface) coupled with processor 703, and/or mobile terminal UE may be incorporated in a vehicle.

As discussed herein, operations of mobile terminal UE may be performed by processor 703 and/or transceiver 701. For example, processor 703 may control transceiver 701 to transmit communications through transceiver 701 over a radio interface to another UE and/or to receive communications through transceiver 701 from another UE over a radio interface. Moreover, modules may be stored in memory 705, and these modules may provide instructions so that when instructions of a module are executed by processor 703, processor 703 performs respective operations (e.g., operations discussed below with respect to Example Embodiments).

Figure 8:
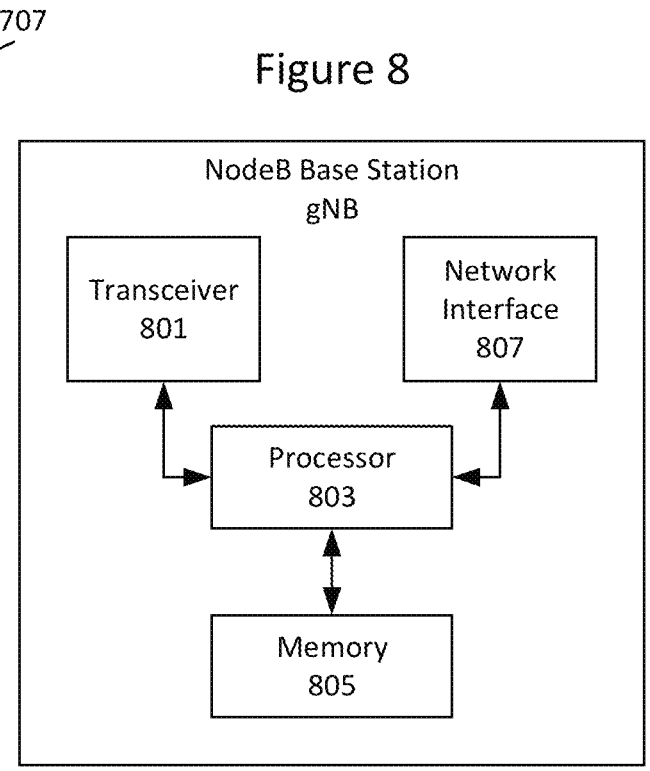
FIG. 8 is a block diagram illustrating a NodeB base station according to some embodiments of inventive concepts.

FIG. 8 is a block diagram illustrating elements of a NodeB base station (also referred to as a network node, base station, eNodeB, eNB, gNodeB, gNB, etc.) of a Radio Access Network (RAN) configured to provide cellular communication according to embodiments of inventive concepts. As shown, the NodeB base station may include a transceiver circuit 801 (also referred to as a transceiver) including a transmitter and a receiver configured to provide uplink and downlink radio communications with mobile terminals. The network node may include a network interface circuit 807 (also referred to as a network interface) configured to provide communications with other nodes (e.g., with other base stations and/or other entities) of the RAN. The NodeB base station may also include a processor circuit 803 (also referred to as a processor) coupled to the transceiver circuit, and a memory circuit 805 (also referred to as memory) coupled to the processor circuit. The memory circuit 805 may include computer readable program code that when executed by the processor circuit 803 causes the processor circuit to perform operations according to embodiments disclosed herein. According to other embodiments, processor circuit 803 may be defined to include memory so that a separate memory circuit is not required.

As discussed herein, operations of the NodeB base station may be performed by processor 803, network interface 807, and/or transceiver 801. For example, processor 803 may control transceiver 801 to transmit communications through transceiver 801 over a radio interface to one or more mobile terminals UEs and/or to receive communications through transceiver 801 from one or more mobile terminals UEs over a radio interface. Similarly, processor 803 may control network interface 807 to transmit communications through network interface 807 to one or more other network nodes/entities and/or to receive communications through network interface from one or more other network nodes/entities. Moreover, modules may be stored in memory 805, and these modules may provide instructions so that when instructions of a module are executed by processor 803, processor 803 performs respective operations.

According to some other embodiments, the network node eNB may be implemented as a control node without a transceiver. In such embodiments, transmission to a mobile terminal may be initiated by the network node so that transmission to the wireless terminal is provided through a network node including a transceiver, e.g., through a base station. According to embodiments where the network node is a base station including a transceiver, initiating transmission may include transmitting through the transceiver.

Figure 9:
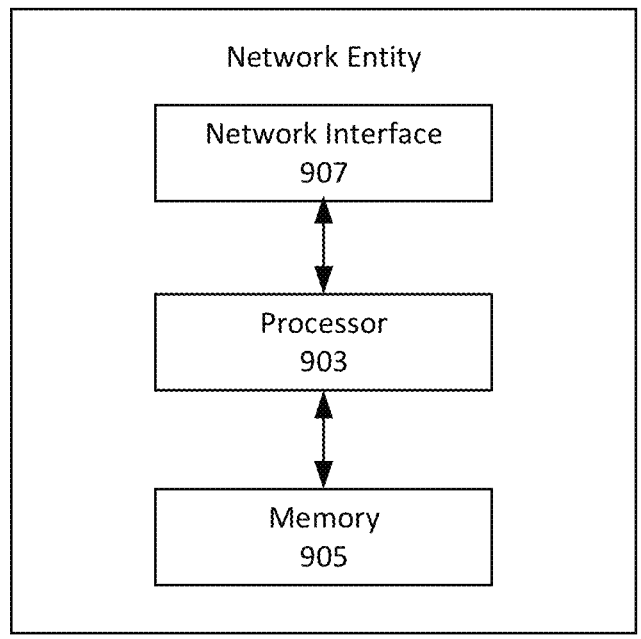
FIG. 9 is a block diagram illustrating a network entity according to some embodiments of inventive concepts.

FIG. 9 is a block diagram illustrating elements of a network entity (e.g., a UPF entity, an AMF entity, an SMF entity, or any other control entity of the radio access network RAN or core network CN) configured to support cellular communication according to embodiments of inventive concepts. As shown, the network entity may include a network interface circuit 907 (also referred to as a network interface) configured to provide communications with other network entities/nodes (e.g., with a base station and/or with another network entity of the RAN and/or CN). The network entity may also include a processor circuit 903 (also referred to as a processor) coupled to the network interface circuit 907, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 903 may be defined to include memory so that a separate memory circuit is not required.

As discussed herein, operations of the network entity may be performed by processor 903 and/or network interface 907. For example, processor 903 may control network interface 907 to transmit communications through network interface 907 to one or more other network nodes/entities and/or to receive communications through network interface from one or more other network nodes/entities. Moreover, modules may be stored in memory 905, and these modules may provide instructions so that when instructions of a module are executed by processor 903, processor 903 performs respective operations. As noted above, the structure of the network entity of FIG. 9 may be used, for example, to implement a UPF entity, an AMF entity, and/or an SMF entity to perform operations thereof as discussed in greater detail below. Operations of a network entity of FIG. 9, for example, may be performed by one network server or distributed across a plurality of network servers having the structure of FIG. 9, and a plurality of such distributed network servers may be collectively referred to as a server.

Figure 1:
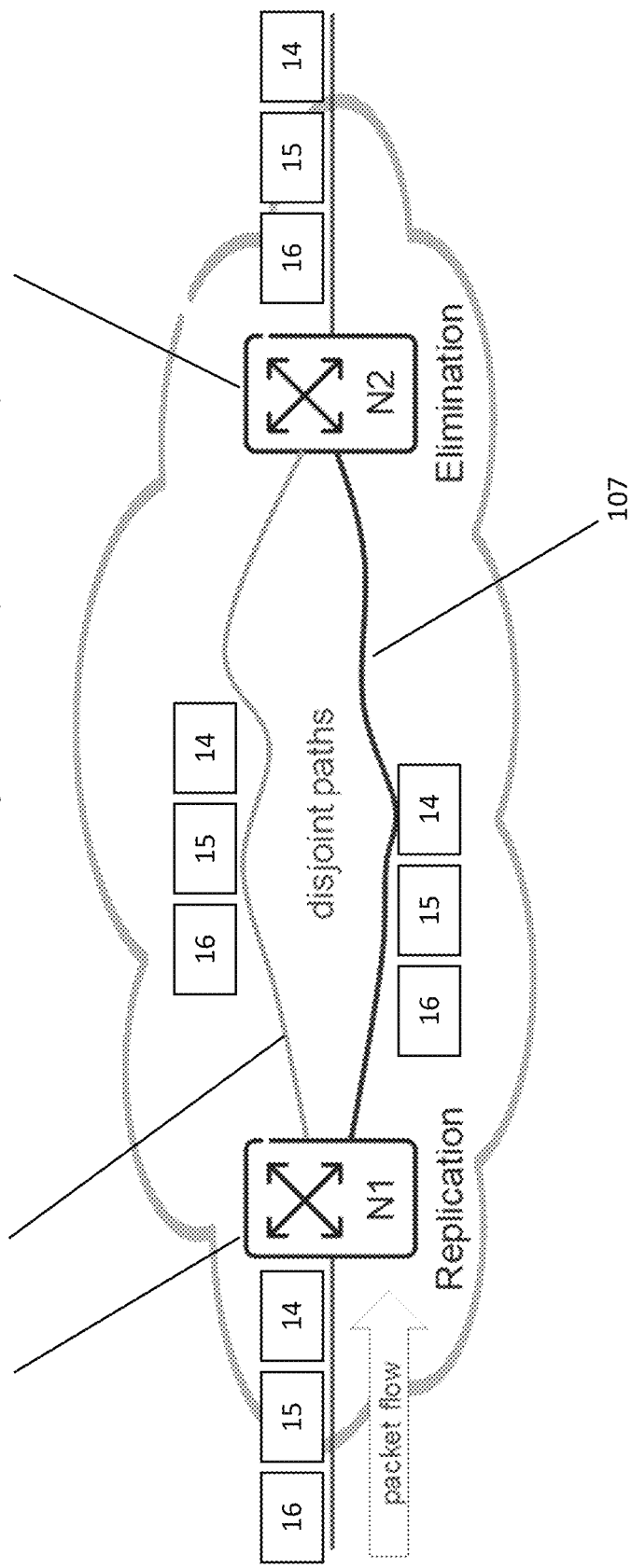
FIG. 1 is a block diagram illustrating a TSN/DetNet reliability approach (FRER/PREF)

The IEEE TSN (Time-Sensitive Networking) Task Group of IEEE 802.1 (also referred to as Reference [1]) provides a standardized solution to provide low latency and high reliability requirements in fixed Ethernet networks. The IETF DetNet activity (also referred to as Reference [10]) extends the approach to layer 3 networks. The structure of a TSN/DetNet approach is illustrated in FIG. 1. A replication entity/node 101 creates a replica of each Ethernet frame (e.g., frames 14, 15, and 16), and assigns a sequence number to it. The elimination entity/node 103 uses the sequence number to find duplicates of the same frame, so that only a single copy of a given frame is forwarded to the egress port. The Frame/Packet Replication and Elimination for Reliability/Packet Replication and Elimination Function (FRER/PREF) function may be applied between intermediate switches, or between the end devices themselves. The paths 105 and 107 taken by the replicated frames are configured to be disjoint, so that a fault on one path does not affect the other path. FIG. 1 illustrates a TSN/DetNet reliability approach (FRER/PREF).

There is a demand for similar types of reliability approaches for 5G (or even 4G/LTE) networks.

One approach is to equip the terminal device with multiple physical UEs. It may then be possible to set up disjoint paths from these UEs. An approach is discussed in International Publication No. WO2017137075 A1 (also referred to as Reference [2]), and this approach presents a way to select different RAN entities for UEs based on a static grouping, whereas an approach in International PCT Application No. PCT/IB2017/052739 (also referred to as Reference [3]) describes a dynamic selection to provide/guarantee that the UEs in the same device use independent RAN entities. The approach in international PCT Application No. PCT/EP2016/064214 A1 (also referred to as Reference [4]) addresses the selection of CN entities in a way that the different UEs in the device can use different CN entities.

Another approach may be to use the Dual Connectivity (DC) feature of 5G or 4G/LTE. Dual connectivity allows a single UE that is suitably equipped with two transceivers to have user plane connectivity with two base stations, while it is connected to a single base station only in the control plane. 3GPP TS 36.300 V14.4.0 (also referred to as Reference [5]) and 3GPP TS 38.300 V2.0.0 (also referred to as Reference [6]) provide more information on dual connectivity in 4G/LTE and 5G. The use of dual connectivity for redundant data transmission is described in 3GPP TS 38.300 V2.0.0 (also referred to as Reference [7]).

The use of two UEs in a single device may imply practical limitations. It may require special purpose-built devices that incorporate two UEs with the additional integration and configuration effort in the UE. This may not be readily available in all UEs, and requiring the integration of two UEs may in certain cases bear unreasonable additional costs. Furthermore, support for multiple UEs per device may have to be coordinated between device vendors and network suppliers.

With the single-UE approach using a dual connectivity approach, the UE may still be required to have two transceivers to be capable of communicating with two base stations, but a single UE with only a single identity may be used. As dual connectivity is a standardized feature, it is expected to be available in the UEs, hence no/little additional complexity or integration effort may be required on the device side. Support for dual connectivity is also expected to be available in networks, both in RAN (Radio Access Network) and CN (Core Network).

Figure 2:
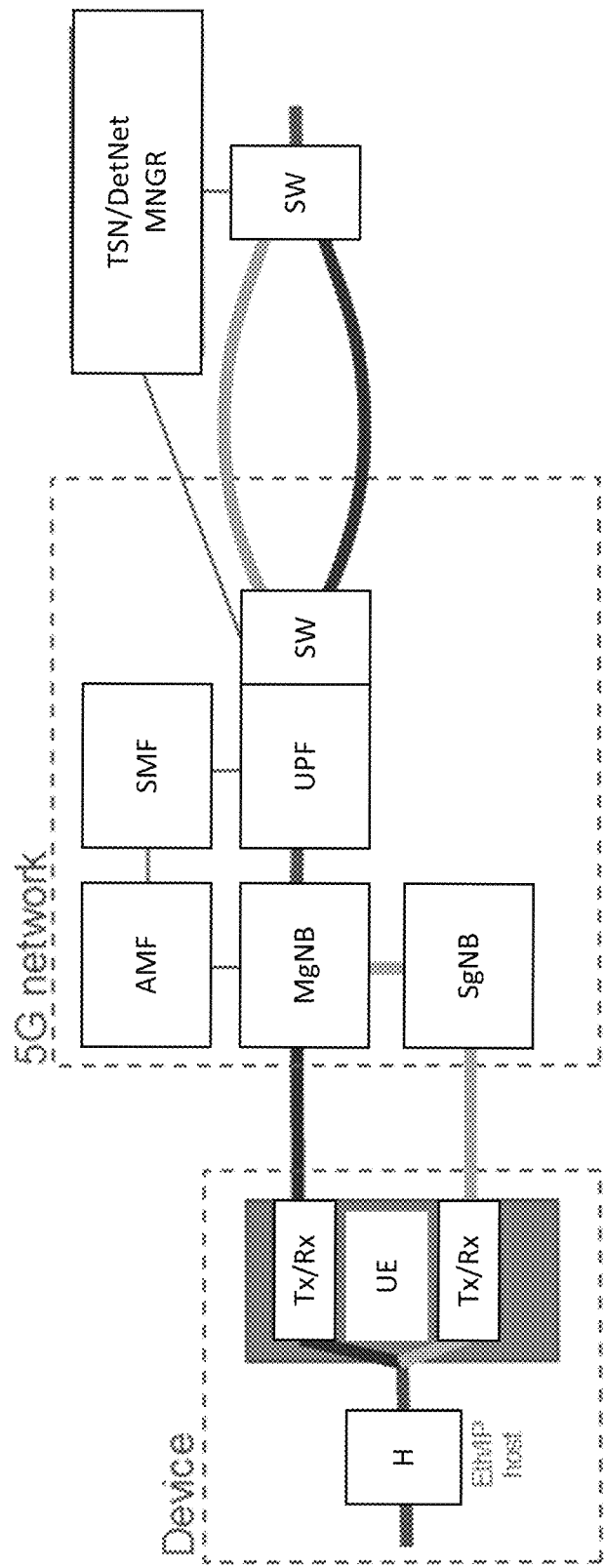
FIG. 2 is a block diagram illustrating a 5G setup.

However, there may still be a drawback of using dual connectivity for redundancy as illustrated in FIG. 2. FIG. 2 shows a 5G setup (see, 3GPP TS 23.501 V2.0.1, also referred to as Reference [8] for a description of the 5G architecture entities), but the same/similar concept can apply to 4G/LTE as well. Dual connectivity can be used for redundancy between the UE and the MgNB (Master gNB), provided on the PDCP (Packet Data Convergence Protocol) layer. At the same time, the fixed transport network between the 5G entities can also apply redundancy, e.g., using the TSN/DetNet approach. Redundancy can also be provided using TSN/DetNet above the 5G network. In this way, there is a redundant user plane path in both in 5G radio and above the 5G network; but the MgNB-UPF connection may not provide redundancy. Note that the UPF may be collocated with the MgNB, but that may still result in the MgNB/UPF being a single point of failure in the user plane. Therefore, it may be important to address this issue, and have two disjoint user plane paths in the user plane all the way from end to end.

Figure 3:
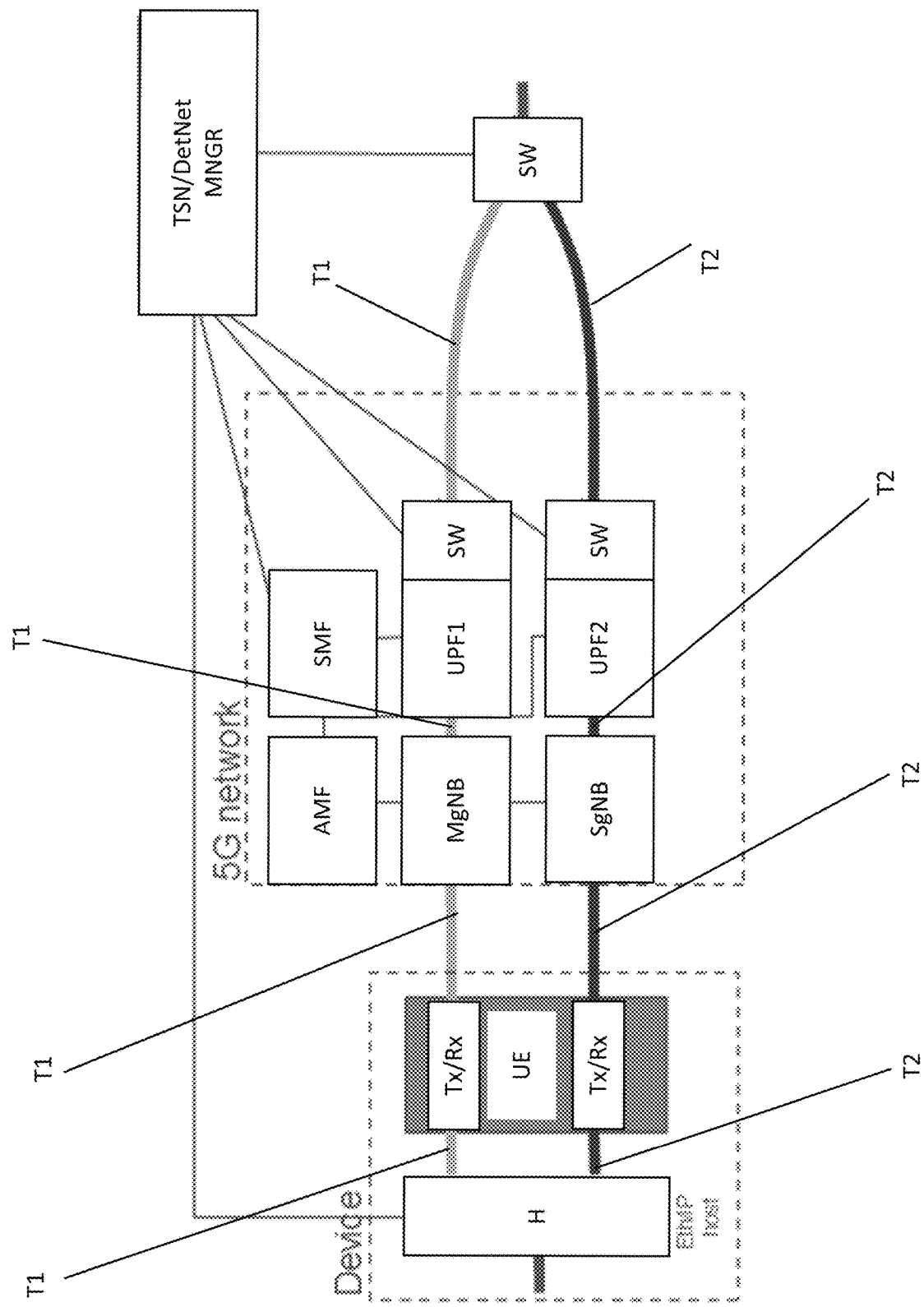
FIG. 3 is a block diagram illustrating redundant traffic flows according to some embodiments of inventive concepts.

According to some embodiments of inventive concepts illustrated in FIG. 3, the RAN (Radio Access Network, e.g., 5G Network) may be set up using dual connectivity over the air interface and the CN (Core Network) in a new way, such that one traffic flow T1 traverses the MgNB and UPF1 (User Plane Function 1), while another traffic flow T2 of the same UE traverses the SgNB and UPF2 (User Plane Function 2). This setup may not be currently possible with dual connectivity, because in existing approaches, either the MgNB is an anchor point of the user plane making other disjoint paths impossible/impractical, or alternatively, there may be a single anchor point in the core network (see, Reference [5] section 4.9.3.2 for current user plane options).

According to some embodiments of inventive concepts, the following operations/elements may be used:

Triggering multiple PDU (Protocol Data Unit) sessions per UE for redundant traffic handling;

The RAN gets information from the CN that it should apply redundant user plane setup, and which traffic flows should be separated in a redundant way;

Based on the information received from the CN, the RAN sets up dual connectivity whenever applicable, so that the redundant flows are separated;

The CN selects different UPF entities for the redundant traffic flows; and/or

The UPFs in the CN are informed about the RAN user plane endpoint that they should use.

For the end device, the two redundant traffic flows may appear as two different Ethernet interfaces (as an example), and existing TSN solutions for setting up redundant paths, with frame replication and elimination, may be used. A central TSN manager may be used as an entity to initiate the redundant user plane path, as well as for setting up the redundant user plane paths above the 5G network.

According to some embodiments of inventive concepts, independent user plane paths may be set up over the radio interface. This may significantly increase a reliability of the communication, as communication may continue without any delay in case of single failures in the user plane (e.g., in case of temporary radio link problems due to interference or loss of coverage, the communication may continue on the other path). Moreover, in a fixed part of the network, a wired link may break, but the communication may continue on the other path uninterrupted.

Setting up multiple PDU sessions for redundancy reasons can be triggered either from the terminal UE, or from the network.

According to some embodiments, the UE may trigger setup of multiple PDU sessions. If the UE triggers setup of multiple PDU sessions, the UE initiates the setup of the second (or additional) PDU sessions for redundancy reasons. This can be based on per UE configuration indicating the need for additional redundancy. Such UE configuration can be provided in advance, or via SIM configuration, or using OTA (Over The Air) configuration methods that is dynamically provided to the UE.

The trigger to set up an additional PDU session for redundancy may also come from the upper layers (e.g., an Ethernet/IP end host may indicate via an API option to the UE that another PDU session for redundancy reasons is needed, which results in a UE request for a new PDU session). Note that the end host may in turn also be triggered from a central network controller via the air interface (i.e., an already established PDU session).

As an optional feature, it may be possible to defer the setup of additional PDU sessions until Dual Connectivity (DC) is set up. This can be realized based on a configurable timer, so that a minimal period of time is kept after the setup of the first PDU session before a second PDU session is attempted, so that the time period is configured in such a way that it is typically sufficient for setting up DC. Alternatively, the deferral can be done until an explicit indication is received over RRC from the MgNB that DC has been set up.

According to some other embodiments, the network may trigger the setup of additional PDU session for redundancy. The network may have information about the need for redundancy either based on subscription or local configuration, or based on UE indication (which may be encoded into the DNN). Alternatively, the network may also get information about the need for redundancy based on explicit indication from a central controller in the local network (e.g., "TSN MNGR"), indicating that a given UE or set of UEs require redundant treatment.

The network trigger may take place immediately at the establishment of the first PDU session. For example, when the PDU Session Establishment Accept message is sent back to the UE, it may include an indication to the UE to set up an additional PDU session. Alternatively, a trigger with an indication to set up an additional PDU session may be sent separately with an explicit message to the UE. The message to the UE may also include some parameters of the PDU session, such as a DNN (Data Network Name).

Similarly, as with the UE triggered option, it may be possible to defer the setup of the additional PDU session until DC has been set up. This can be done based on a timer, so that a configurable amount of time must pass after the first PDU session has been set up. Or alternatively, triggering the second PDU session can be deferred until the CN gets an indication from RAN that DC has been set up.

A need for redundant handling may be indicated to RAN as discussed below.

In some systems, Dual Connectivity DC may be under RAN control, meaning that it is the RAN's responsibility to decide whether or not to apply DC, and how to configure it. According to some embodiments of inventive concepts, however, the redundant user plane handling may require the use of DC whenever applicable, hence the CN may need to instruct the RAN to apply it. This may be accomplished in several ways discussed below:

The CN may send an indication to RAN to apply DC with a different gNB for each PDU session, using a new information element on a per UE basis.

The CN may send a Redundancy Sequence Number, RSN, for each PDU session, so that whenever possible, RAN tries to use different gNBs for each PDU session that has a different number. This could be more flexible, as it could be possible to direct RAN to either use different or the same gNB for two PDU sessions (where some PDU sessions may not require redundancy).

The CN may define groups of PDU sessions, and indicate which group a given PDU session belongs to. PDU sessions in the same group are preferably served by different gNBs for redundancy. It may be possible for a PDU session to not belong to any of the groups, in which case they can be served by any gNB (no redundancy required).

The CN may indicate explicitly which gNB (i.e., the MgNB or an SgNB) should handle a given PDU session, using an identifier or index of a gNB. This is especially well suited to local network cases where the UPF is close to or collocated with the gNB. In that case, the RAN should use the gNB close to the corresponding UPF, rather than another gNB.

Instead of providing information on a per PDU session basis, the CN may also provide the information on a per flow basis as well, using the per flow QoS marking. Then the RAN can map the flows to one or the other gNB and corresponding radio bearer.

The RAN may be informed that different UPFs are used for the different PDU sessions via checking the UPF tunnel endpoint addresses. For example, in the case of a local network, RAN could use the gNB that is close to or collocated with the UPF, as determined by its address. Detecting different UPFs (or special address ranges of UPFs) may also provide a trigger for the RAN to establish redundancy via the use of DC.

As an alternative, the information about which PDU sessions to handle redundantly via DC may also be provided by the UE to the RAN. Similar information as described above may be sent from the UE to the MgNB using RRC signaling. However, even in this case the RAN should receive information from the CN to indicate whether the UE is authorized to request redundancy based on DC, so that the network operator can remain in control of using DC for redundancy purposes. Also in this case, the CN may need to provide different UPFs for the PDU sessions. For this, the UE may also indicate on the NAS level which PDU sessions to handle redundantly.

As will be discussed below with respect to dynamic selection of an SgNB, it may be possible that the CN needs to request RAN to set up DC even before the corresponding PDU sessions are established. This may be requested via an explicit trigger.

Normally, the selection of an SgNB is under RAN control in the MgNB, and the MgNB may also change the selection (e.g., if RAN radio conditions so dictate). Changing the SgNB may be problematic, however, since it may lead to non-redundant paths, and also it may require the UPF to be changed, since the UPF selection can be done based on the SgNB selection. Not all deployments may be able to cope with such consequences of SgNB change (or the removal of the SgNB). Hence, it may also be indicated to RAN, possibly using an explicit indication, that the selected SgNB should not be changed while the UE is connected. A network which is not able to handle such SgNB changes may send such an indication.

If there is a need to change (or remove) the SgNB (e.g., due to radio conditions) while the CN is not able to cope with it, then the RAN (i.e., MgNB) may send an indication about the needed SgNB change to the CN, and the CN can then decide to release the given PDU session. The CN may also indicate the need to re-establish the PDU session, and in that case the re-established PDU session may use the new SgNB.

Selection of UPFs for the PDU sessions will now be discussed.

Two main aspects may need to be considered for selecting UPFs. First, in order to provide/guarantee independent paths, the UPFs may need to be different for the different PDU sessions. Second, the UPFs should be close to the respective MgNB or SgNB to provide/guarantee efficient, short paths, and/or to simplify the management of the independent paths and provide that the underlying transport network links are independent for the MgNB-UPF1 and SgNB-UPF2 connectivity.

There can be two approaches to provide/ensure that the UPFs for the multiple PDU sessions are separate. One approach is based on using a single SMF for the PDU sessions, and one approach does not require the SMFs to be the same. Both approaches are discussed below.

Single SMFs may be provided for PDU sessions.

Once providing that the PDU sessions for the UE use the same SMF, that SMF can provide/guarantee that different UPFs are selected. There could be a number of ways for that to happen.

One part of the Data Network Name (DNN) may indicate to the Access and Mobility Management Function (AMF) that the PDU session is part of a set of PDU sessions which should be handled redundantly. Another part of the DNN may uniquely identify the set of PDU sessions handled redundantly for the given UE (e.g., a DNN may take this value: session1.group1.reliable.localindustry.org for one PDU session and this value: session2.group1.reliable.localindustry.org for one PDU session for another PDU session. The part reliable.localindustry.org indicates that this is a PDU session to be handled redundantly. Group1 indicates the group of PDU sessions that realize the redundancy and need a common SMF. Session1 and session2 indicate the PDU sessions within the group.

Alternatively, a special field may indicate in the PDU Session Request the need for redundant handling, and another special field may identify the group of PDU sessions that belong together for redundant handling, and yet another special field may identify the PDU session within the group of PDU sessions.

The AMF entity may be responsible for selecting the SMF. The AMF can select the same AMF for the PDU sessions in the same redundancy group once the information is available to the AMF using the DNN or special fields.

According to some embodiments, no single SMFs may be provided for PDU sessions.

If the AMF does not guarantee the same SMF for the PDU sessions, there may still be ways to make sure that the UPFs are selected separately. A number of embodiments are described below.

The UPFs may be grouped statically into group1, group2, etc. For each newly established PDU session we may know whether it is the first or second, etc. PDU session based on the information provided in the PDU session establishment (as part of the DNN or in a separate field). In an alternative, the AMF may provide that information based on counting the PDU sessions. For the first PDU session, a UPF from group1 is selected; for the second PDU session a UPF from group2 is selected, etc. In this way, different UPFs may be provided/guaranteed, even though the UPF selection might not be optimal due to the static grouping.

Another network entity, such as the UDM or the AMF may store the allocated UPFs for a given UE. When a new UPF needs to be selected, the already assigned UPFs can be queried so that a new one is selected.

The SMF may query other SMFs in the same network for the already assigned UPFs before UPF selection, so that a different UPF can be selected. Since the number of SMFs in a network may be limited, this approach could be used without querying to many entities—however, this may still result in increased signaling.

UPF selection based on the location of the respective MgNB/SgNB may also provide/ensure that the UPFs are separate. Consideration of MgNB/SgNB locations is discussed below.

According to some embodiments, UPFs may be allocated by using a UPF that is close to the gNB in a network deployment where there is a separate nearby UPF for each gNB. As an example, in a local network there may be a UPF collocated with each gNB. If a UPF close to the MgNB is selected for the first PDU session whose user plane is handled by the MgNB, and another UPF close to the SgNB is selected for the second PDU session whose user plane is handled by the SgNB, then separate UPFs may be provided.

There may be several options for considering the MgNB in the UPF selection in the case of the first PDU session as discussed below.

The identity of the MgNB may be provided from the AMF to the SMF. Based on configuration or using a database (e.g., via Domain Name System DNS lookup), the MgNB may be mapped to a local UPF.

The AMF or the SMF may send a query to the MgNB to provide the identity of a local UPF if one is set up.

The MgNB may attach information about the identity of the local UPF to the uplink message in the PDU Session Establishment procedure. This information may also be provided in the case of other messages, and there could also be a trigger from the UE to provide such information (e.g. using a flag on the RRC protocol). Once this information is received in the AMF it can be forwarded to the SMF.

Similar options may also be applicable for considering the SgNB in the UPF selection in the case of the subsequent PDU session. However, an issue to consider is that the SgNB may be selected by the MgNB later on based on signal strength measurements, and in certain deployments there may be multiple SgNBs to choose from. Therefore, the actual method may depend on the deployment, considering whether the SgNB is known in advance, or dynamically selected in RAN.

If the identity of the SgNB is known in advance based on the MgNB, this may be pre-configured in the CN (e.g., AMF, SMF), or the MgNB may provide the expected SgNB on query, or during PDU Session Establishment, as an addition to the information on the MgNB. Then, for the subsequent PDU sessions the SgNB can be mapped to the UPF similarly as with the MgNB.

Embodiments when the SgNB for Dual Connectivity is dynamically selected in the RAN in MgNB are considered in more detail below.

Dynamic selection of an SgNB will now be discussed.

It may take a certain amount of time before the RAN can determine the suitable SgNB based on UE measurements that are reported to the MgNB. This delay may need to be handled in deployments where the SgNB is dynamically selected.

There may be two main options regarding how to harmonize the selection of the SgNB in the RAN and the corresponding UPF selection in the CN.

The subsequent PDU session can be set up first without redundancy in the user plane. Once DC is set up, the subsequent PDU session is modified as needed.

DC setup may first be triggered in the RAN. Once DC setup is done, a subsequent PDU session may be established considering the selected SgNB.

A subsequent PDU session may be established before DC setup.

The subsequent PDU session may be set up first without redundancy in the user plane. Once DC is also established, the subsequent PDU session may be modified as needed. In this approach, it may be possible that the UPF indicated initially is changed later on, which should be taken into account in the CN. For that reason, the UPFs for the PDU sessions may initially not be disjoint, and it may take some time before a new UPF is selected that is different. This approach also shows how an SgNB change later on may be handled, something that may apply to other embodiments as well, and an SgNB change may need to be reflected in an UPF change.

Note that the possibility of UPF change may need different handling for Ethernet and IP based approaches. In an Ethernet based approach, there may not be a need to maintain a single PDU session anchor point, since the Ethernet network may learn that the UE is reachable at another location based on, for example, MAC learning. In the case of Ethernet, it may be possible to use a local UPF as a point of interconnect to the Ethernet network, and change it as needed.

On the other hand, for IP based sessions, it may not be possible to change the PDU session anchor. Instead, the PDU session may be released and a new PDU session may be established in case the UPF acting as the session anchor needs to be changed. This is also a possible approach according to some embodiments of inventive concepts, even though it might not be very efficient. As another alternative, it may be possible to assign a more central PDU session anchor which does not change during a session even if an intermediate UPF is changed. However, having multiple UPFs for a single PDU session may not be very efficient, either.

For this embodiment, it may be possible for the CN to receive notification about the changes in the SgNB, and update the user plane path accordingly. This is shown in the signaling chart of FIGS. 4A, 4B, and 4C below, where UPF1 is initially used for the second PDU session as well. Once DC is set up, the UPF2 is selected based on the location of the chosen SgNB for the second PDU session, and hence SMF2 changes PDU Session 2 to UPF2. (Here SMF1 and SMF2 refer to the SMF responsible for PDU session 1 and 2, respectively—in this case the is no assumption that the two SMFs are always the same.)

Figure 4A:
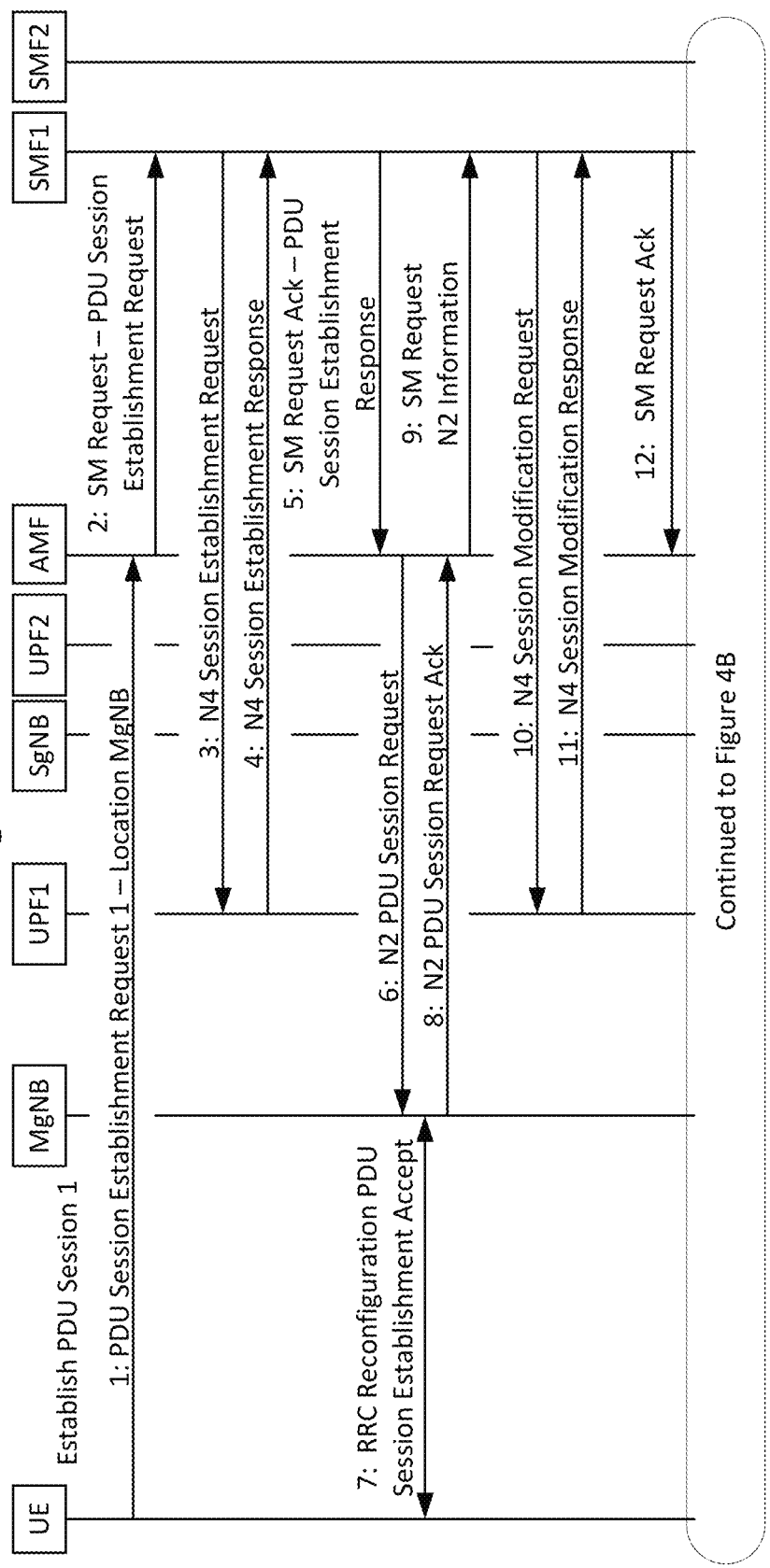
FIGS. 4A, 4B, and 4C provide a message diagram illustrating network operations according to some embodiments of inventive concepts.
Figure 4B:
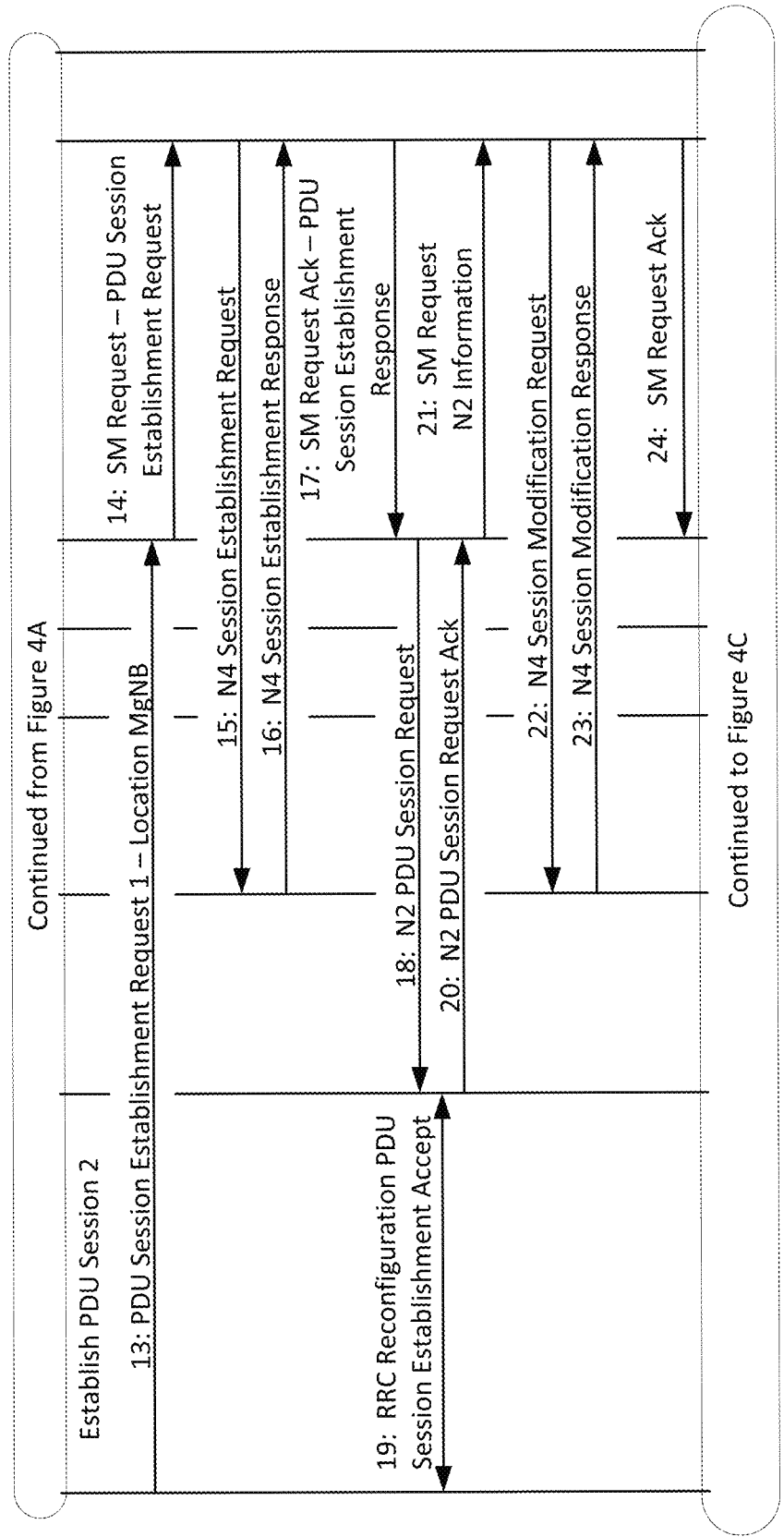
Figure 4C:
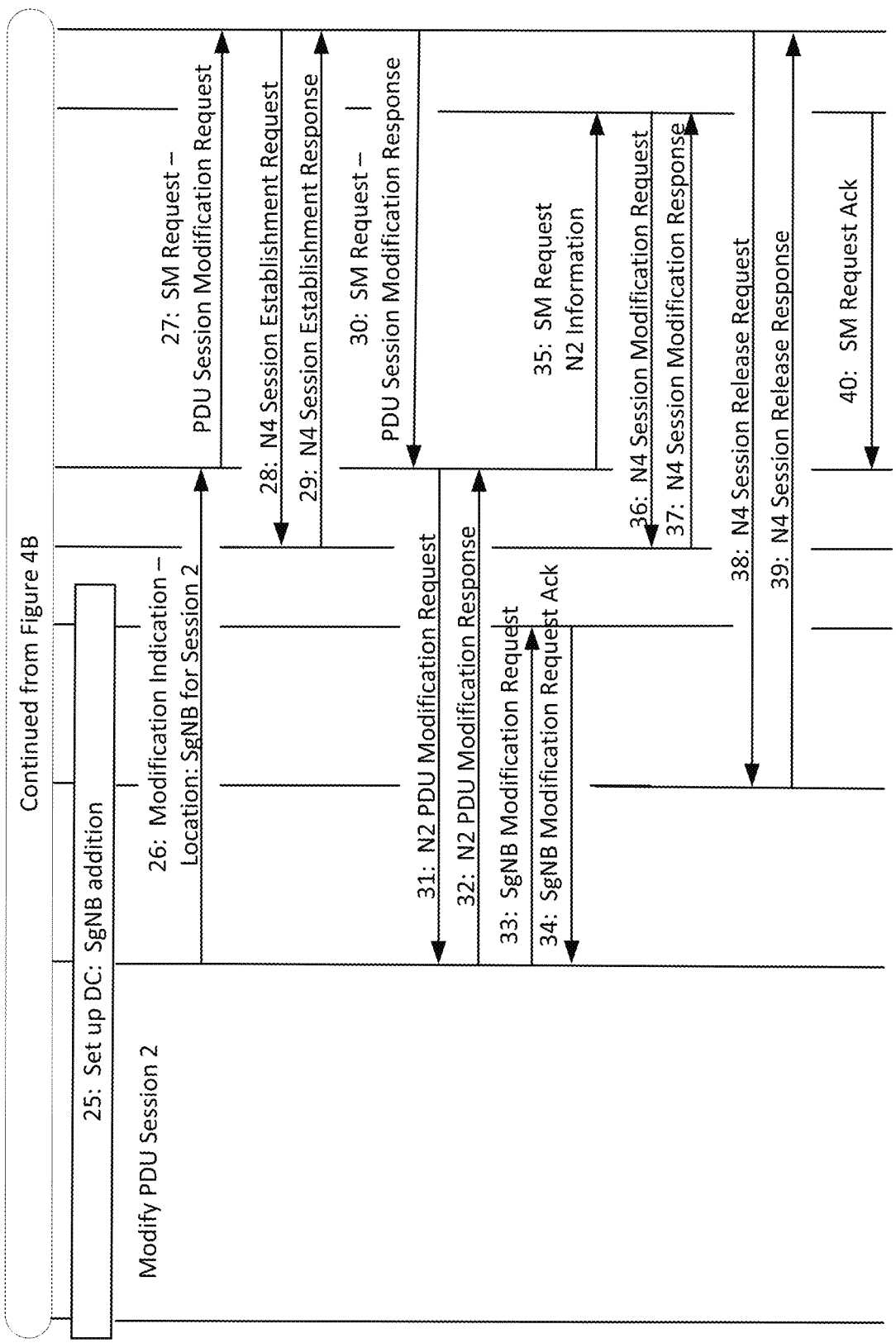

FIGS. 4A, 4B, and 4C provide a message diagram where RAN changes trigger a UPF change when DC is established.

In operations 1-12 of FIG. 4A, PDU session 1 is established, as described in section 4.3.2.2 of TS 23.502 V2.0.0 (also referred to as Reference [9]), where the location of MgNB is used to select UPF1. In operations 13-24 of FIG. 4B, PDU session 2 is established in a similar way, where the same MgNB is indicated as the location as DC is not yet set up. In operation 25 of FIG. 4C, DC is set up, which may require some time, including UE measurement reports sent to MgNB. In operation 26, a modification is indicated from MgNB towards the CN that SgNB is used for the user plane of session 2. Based on a mapping of the location of the SgNB, it is suggested to use UPF2 instead of UPF1 for session 2. As a consequence, SMF2 establishes UPF2, and MgNB is informed in operations 27-32 of FIG. 4C. The MgNB then modifies the configuration of SgNB to use UPF2 in operations 33-34 of FIG. 4C.

A possible disadvantage of the approach in FIGS. 4A-C is that there may be an initial period of time when the second PDU session is already established, but DC is not yet set up and also the two PDU sessions use the same UPF, hence the user plane paths are not disjoint. Further, the change of UPF can complicate the management of the disjoint path—in case of a TSN/DetNet network where the paths are managed by a central controller "TSN/DetNet MNGR", that central controller would have to detect—based on reporting from the network entities—that the UE gets connected to a new UPF, and update the path accordingly.

According to some embodiments of inventive concepts, PDU session re-establishment may be triggered by an SgNB change.

As noted above, a change in the SgNB (e.g., due to DC setup) may require a UPF change which may be complex to handle in some deployments. An indication may be sent to RAN that SgNB change should be avoided, nevertheless in some cases this may still be needed due to changes in the radio conditions.

As another possibility compared to UPF change for the ongoing PDU session, the CN can decide to release the PDU session and request the establishment of a new one in case of SgNB changes. Given that there is another PDU session that can carry traffic due to redundancy, this re-establishment might not cause a packet loss.

The approach of re-establishing the PDU session may be well suited for an IP based solution, where—as opposed to Ethernet approach—it is not possible to change the anchoring UPF which owns the IP address.

Figure 5B:
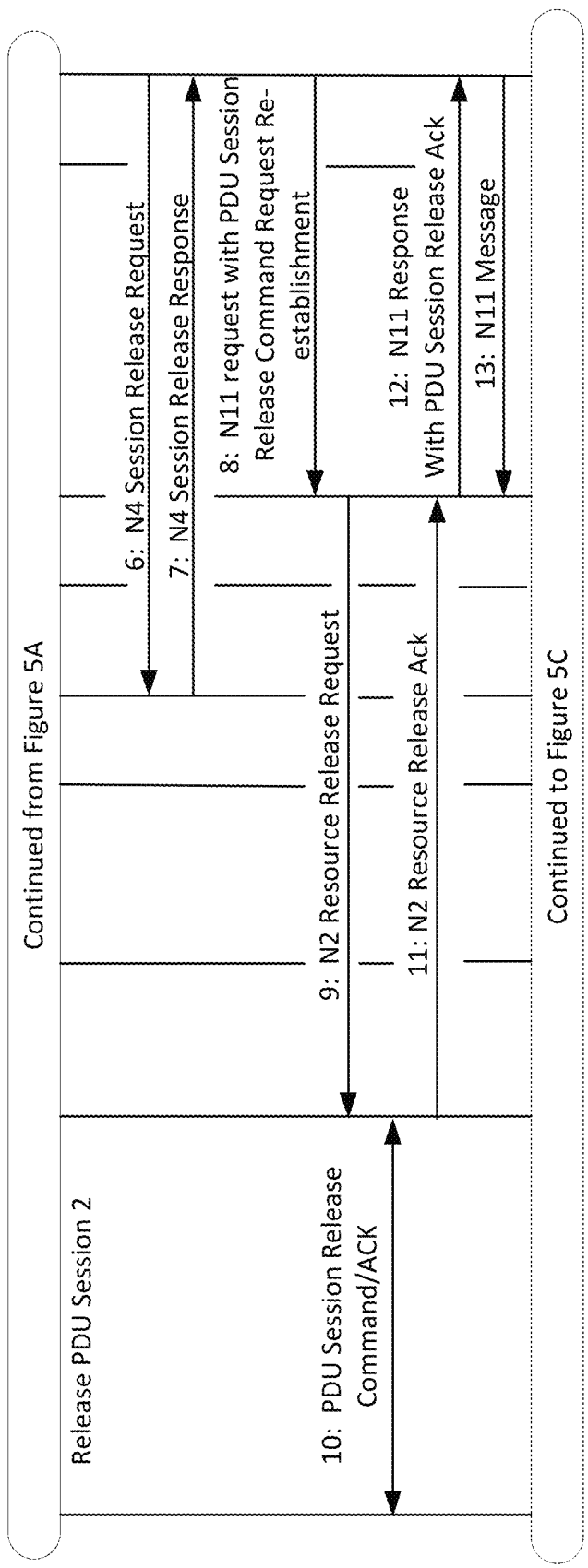
Figure 5C:
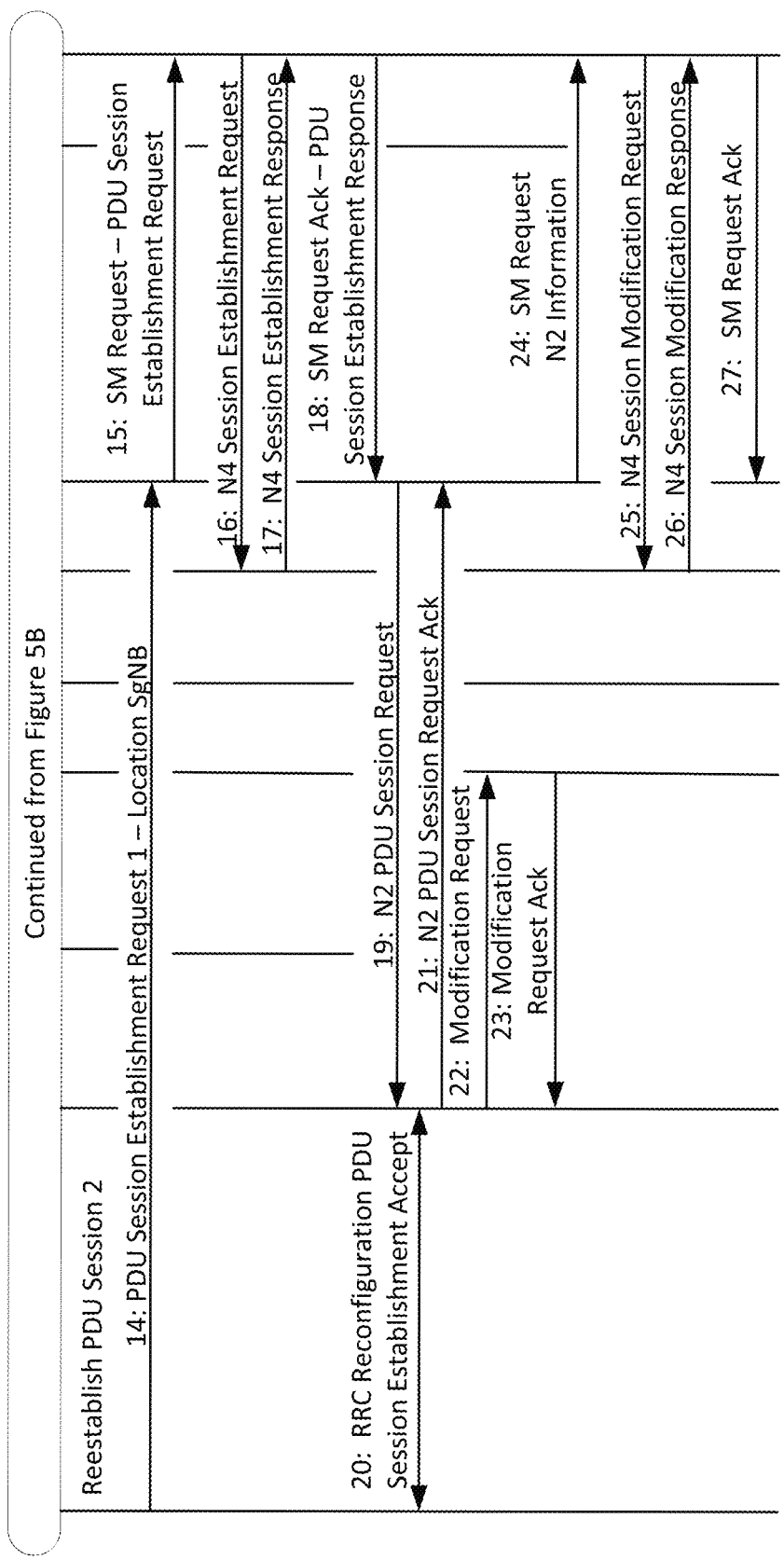

This approach is shown in the message diagram of FIGS. 5A, 5B, and 5C. Initially at operations 1 and 2 of FIG. 5A, PDU sessions 1 and 2 are established/setup (as discussed above with respect to FIGS. 4A and 4B). When there is a change in the SgNB (either due to DC setup or SgNB modification) at operation 3 of FIG. 5A, an indication is sent in operation 4 of FIG. 5A to the AMF, which is forwarded in operation 5 of FIG. 5A to the SMF corresponding to the given PDU session that has traffic via the SgNB. Then, the SMF (SMF2 in this example) releases the PDU session, with an indication to request the re-establishment of the PDU session (operations 6-13 of FIG. 5B). In operations 14-27 of FIG. 5C, a UE triggered new PDU session is established, which can then consider the new SgNB and select an appropriate UPF.

Note that the TSN/DetNet MNGR may also be informed about the temporary release of the second path, and control the re-establishment of it.

FIGS. 5A, 5B, and 5C provide a message diagram illustrating handling of SgNB change (or DC setup) via PDU session re-establishment.

According to some embodiments of inventive concepts, a subsequent PDU session may be established after DC setup.

A possible approach to the issues described above may be to send an indication to the RAN to start setting up DC already after the establishment of the first PDU session, even before the second PDU session is established. Once DC is set up, RAN indicates it to the CN (e.g., by signaling from MgNB to AMF to SMF). This approach may be simpler, as there may be no/reduced need to change the UPF later on. This approach may also simplify interaction with the transport network and the task of the TSN/DetNet MNGR.

This signaling may indicate the selected SgNB which is then mapped to the UPF; or alternatively, the RAN may indicate the preferred UPF corresponding to the selected SgNB. The indication from RAN to the CN may then trigger a message to the UE to set up the second PDU session. (Alternatively, the MgNB may directly trigger the UE via RAN signaling to set up the second PDU session.) The SgNB or UPF to be used may also be indicated during the PDU session establishment (or this information could be queried from the MgNB during the PDU session establishment). This approach is shown in the message diagram of FIGS. 6A, 6B, and 6C.

Figure 6A:
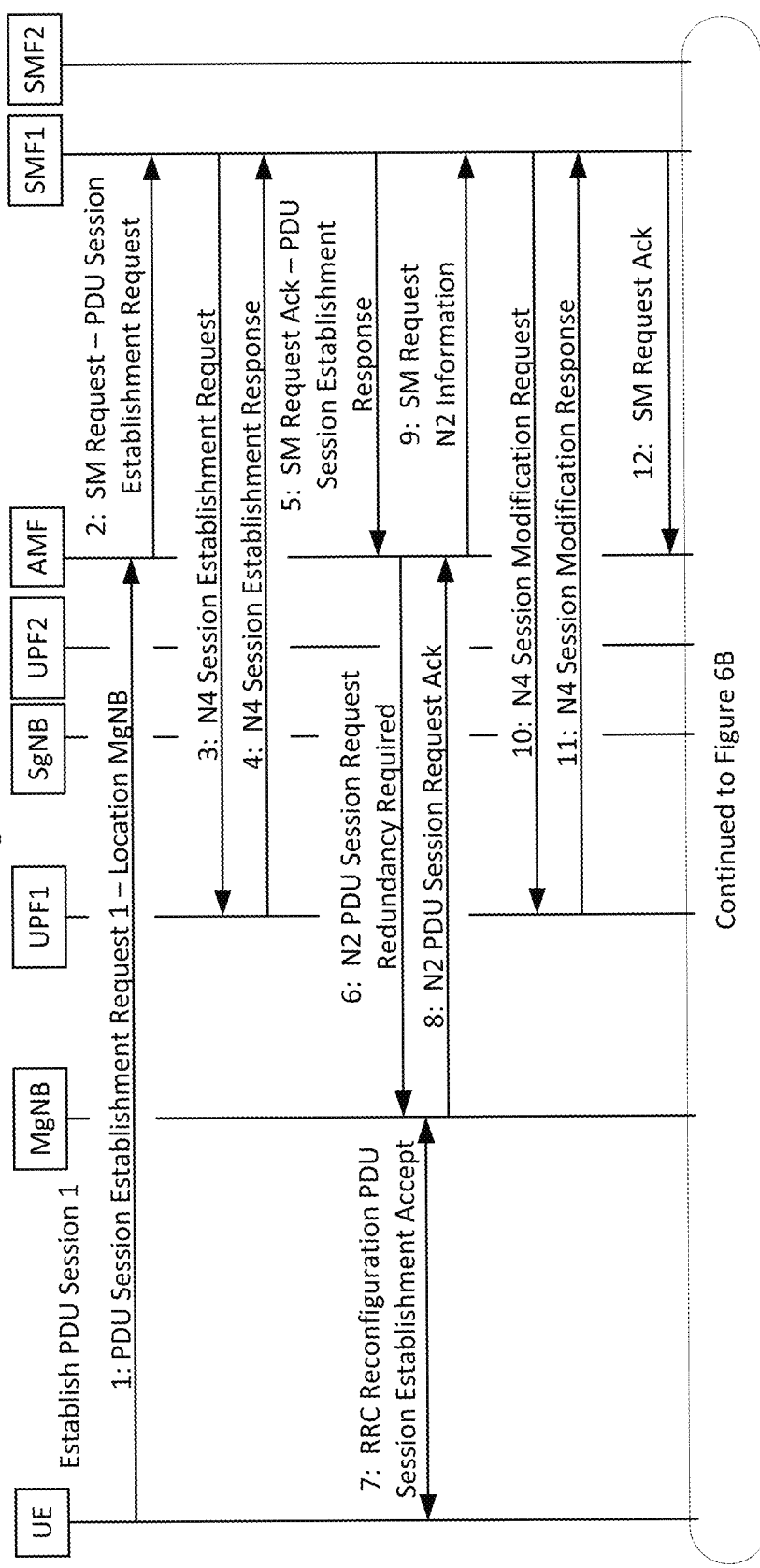
FIGS. 6A, 6B, and 6C provide a message diagram illustrating network operations according to some embodiments of inventive concepts.
Figure 6B:
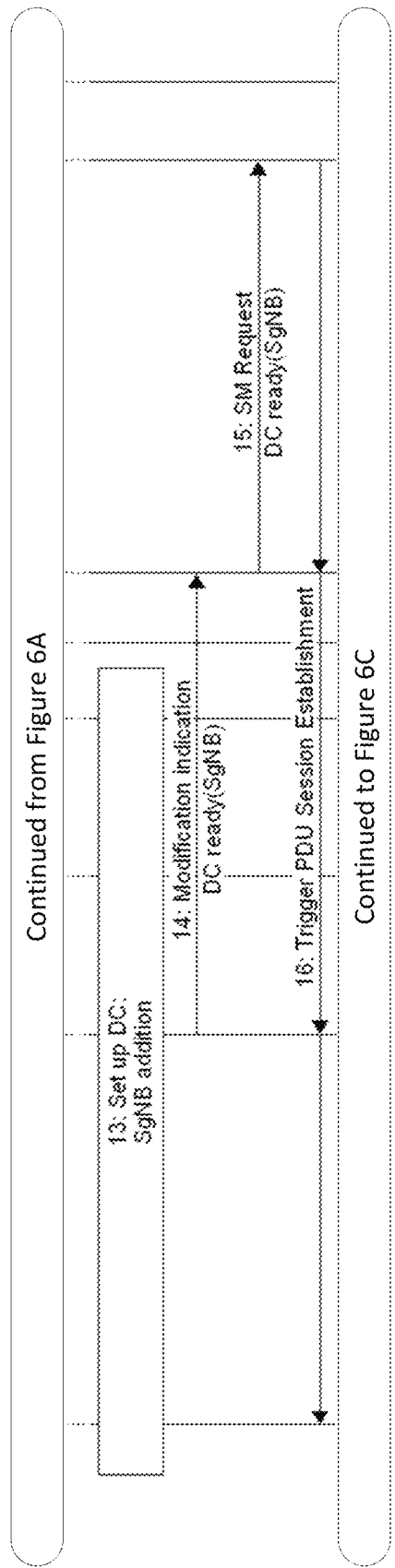
Figure 6C:
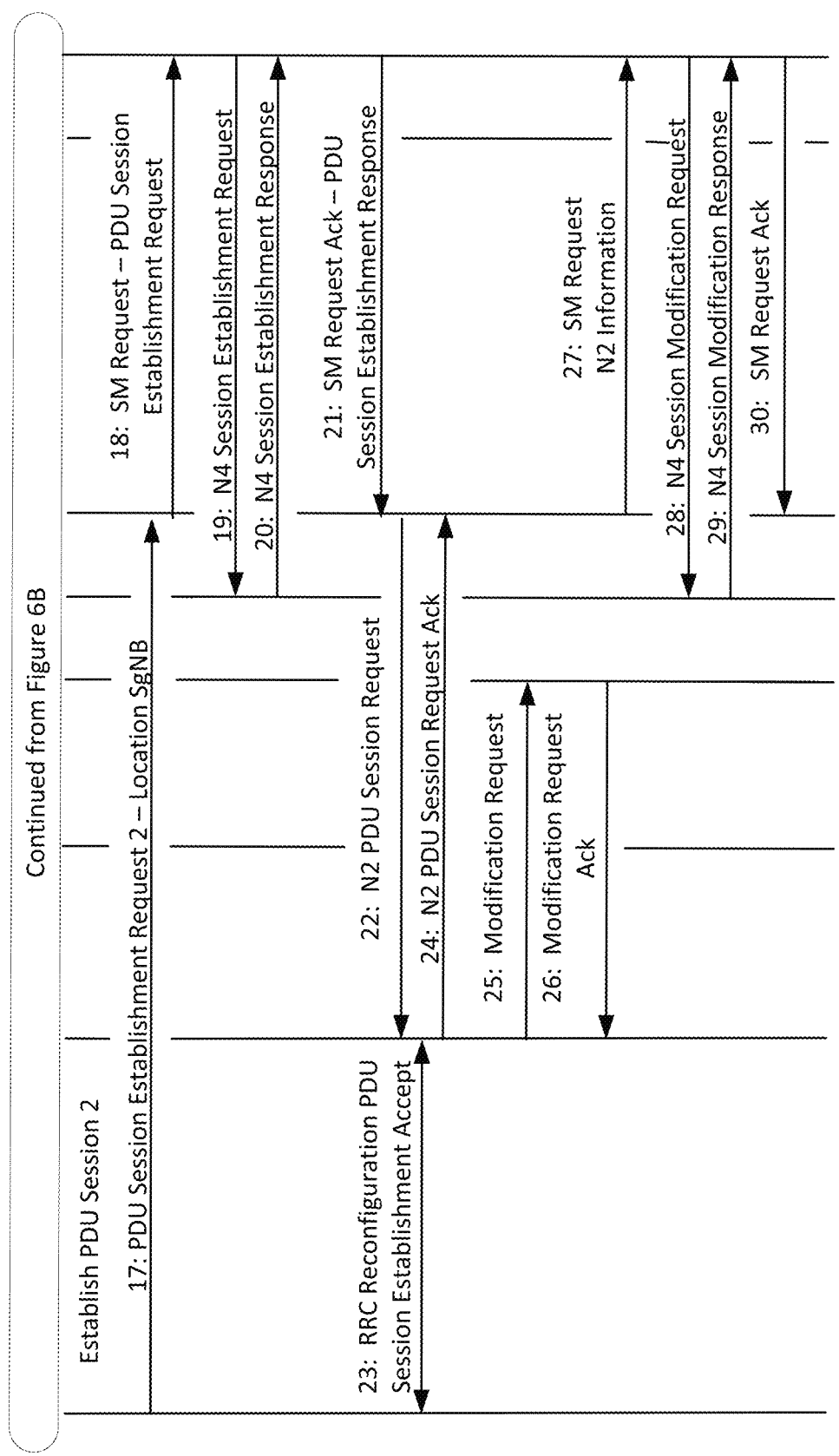

FIGS. 6A, 6B, and 6C provide a message diagram illustrating deferred establishment of a second PDU session until RAN is ready to set up DC.

In operations 1-12 of FIG. 6A, PDU session 1 is set up. As part of this process, in operation 6 of FIG. 6A it is indicated to the RAN that DC will be required for redundancy reasons. A need for redundant handling may be indicated to RAN as discussed above to trigger DC. Note however that in this case, it may be indicated to the RAN (possibly using an explicit flag) that DC is needed despite the fact that the PDU session with traffic that will be passing via the SgNB is not yet set up.

Then in operation 13 of FIG. 6B, the MgNB sets up DC, by adding SgNB. Note that at this point, there may be no user plane traffic yet that is going via SgNB, but the use of SgNB is set up in preparation for accepting traffic. In operation 14 of FIG. 6B, a Modification indication is sent from MgNB to the AMF, which indicates the DC is now ready to be used. This indication may also include the identity of SgNB, or the corresponding UPF. Operation 14 of FIG. 6B may trigger an Session Management (SM) message to the SMF in operation 15 to indicate that DC is ready. That in turn may trigger a message to the UE in operation 16 of FIG. 6B to trigger the establishment of the second PDU session. Alternatively, instead of operations 14-16 of FIG. 6B, the AMF may also generate a trigger to the UE to set up a new PDU session.

The second PDU session may be established in operations 17-28 of FIG. 6C, which takes into account the SgNB location for selecting UPF2. There could be several options for conveying this information.

The SgNB (or UPF2) identity may be included in the message of operation 16 to the UE, which is then repeated in operation 17 so that it can be conveyed to the SMF.

The MgNB may attach the SgNB identity to the message of operation 17.

The AMF may store the SgNB identity in operation 14 so that it can inform SMF in operation 18.

The AMF or the SMF2 may query MgNB for the identity of the SgNB during the establishment of the second PDU session.

Once UPF2 is established, RAN is informed in operation 22 of FIG. 6C. The MgNB notifies the SgNB about the UPF2 to be used for uplink communication in operations 25-26 of FIG. 6C. In addition or in an alternative, operations 25-26 of FIG. 6C may be executed before operation 24 of FIG. 6C.

Note that the approach of FIGS. 6A, 6B, and 6C may have variants depending on the need to support other cases. For example, it may be possible that the first PDU session is set up without requiring DC, and an explicit message from CN to RAN may be used to trigger DC when the need arises, followed by the setup of a subsequent PDU session with redundant user plane.

According to some embodiments, the CN may trigger the RAN to establish Dual Connectivity, in combination with selecting different UPF1 and UPF2 for the traffic via the MgNB and via SgNB, respectively. The CN may explicitly indicate to the RAN which traffic to handle redundantly. This may result in two user plane paths, one via MgNB-UPF1 and one via SgNB-UPF2. The user plane paths are disjoint (also referred to as independent), and can be applied for redundant traffic handling in scenarios where high reliability is of importance.

Operations of a network Access and Mobility Function (AMF) entity will now be discussed with reference to the flow chart of FIG. 10. The AMF entity, for example, may be implemented as an element of a core network CN of the wireless communication network using one server or a plurality of distributed servers (collectively referred to as a server). For example, modules may be stored in network entity memory 905 of FIG. 9, and these modules may provide instructions so that when the instructions of a module are executed by network entity processor 903 (which may include a plurality of distributed processors), processor 903 performs respective operations of the flow chart of FIG. 10. In operations discussed with respect to FIG. 10, AMF entity processor 903 may transmit and/or receive messages/requests through network interface 905.

At block 1001, processor 903 may establish a first PDU session for a wireless terminal UE using a first NodeB base station MgNB and a first user plane function UPF entity UPF1 (e.g., using a first PDU session establishment module). At block 1003, processor 903 may establish a second PDU session for the wireless terminal UE using a second NodeB base station SgNB and a second UPF entity UPF2 (e.g., using a second session establishment module). The first and second PDU sessions may be established for the wireless terminal UE using the first and second NodeB base stations MgNB and SgNB so that the first and second PDU sessions are provided concurrently using dual connectivity DC to provide redundant data paths for communication of data for the wireless terminal UE through the wireless communication network.

Operations of FIG. 10 may be used to provide the first and second PDU sessions using dual connectivity as discussed above with respect to FIGS. 4A-C. For example, establishing the second PDU session at block 1003 may include establishing the second PDU session for the wireless terminal UE using the first NodeB base station MgNB and the first UPF entity UPF1 as discussed above with respect to operations 13-24 of FIG. 4B, and modifying the second PDU session for the wireless terminal UE to use the second NodeB base station SgNB and the second UPF entity UPF2 after establishing the second PDU session using the first NodeB base station MgNB and the first UPF entity UPF1, as discussed above with respect to operations 26-40 of FIG. 4C.

In addition, establishing the first PDU session using the first NodeB base station MgNB and the first UPF entity UPF1 at block 1001 may include establishing the first PDU session responsive to the first session establishment request received from the wireless terminal UE through the first NodeB base station MgNB as discussed above with respect to operation 1 of FIG. 4A. Establishing the second PDU session using the first NodeB base station MgNB and the first UPF entity UPF1 may include establishing the second PDU session responsive to a second session establishment request received from the wireless terminal UE through the second NodeB base station SgNB as discussed above with respect to operation 13 of FIG. 4B. Modifying the second PDU session may include modifying the second PDU session responsive to a modification indication message received from the first NodeB base station MgNB as discussed above with respect to operation 26 of FIG. 4C. Moreover, the modification indication message from the first NodeB base station MgNB may include an identification of the second NodeB base station SgNB for DC communication with the wireless terminal UE using the first and second NodeB base stations MgNB and SgNB.

Moreover, establishing the first PDU session using the first NodeB base station MgNB and the first UPF entity UPF1 may include transmitting the first session management request of operation 2 of FIG. 4A to establish the first UPF entity UPF1 for the first PDU session responsive to the first session establishment request of operation 1 of FIG. 4A. Establishing the second PDU session using the first NodeB base station MgNB and the first UPF entity UPF1 may include transmitting the second session management request of operation 14 of FIG. 4B to establish the first UPF entity UPF1 for the second PDU session responsive to the second session establishment request of operation 13 of FIG. 4B. Modifying the second PDU session may include transmitting the third session management request of operation 27 of FIG. 4C to establish the second UPF entity UPF2 for the second PDU session responsive to the modification indication message of operation 26 received from the first NodeB base station.

Operations of FIG. 10 may be used to provide the first and second PDU sessions using dual connectivity as discussed above with respect to FIGS. 5A-C. For example, establishing the second PDU session may include establishing the second PDU session for the wireless terminal UE using the first NodeB base station MgNB and the first UPF entity UPF1 as discussed above with respect to operation 2 of FIG. 5A (performed using operations 13-24 of FIG. 4B), releasing the second PDU session as discussed above with respect to operations 6-13 of FIG. 5B, and after releasing the second PDU session, reestablishing the second PDU session using the second NodeB base station SgNB and the second UPF entity UPF2 as discussed above with respect to operations 14-27 of FIG. 5C.

In addition, establishing the first PDU session using the first NodeB base station MgNB and the first UPF entity UPF1 may include establishing the first PDU session responsive to a first session establishment request received from the wireless terminal UE through the first NodeB base station MgNB as discussed above with respect to operation 1 of FIG. 4A as referenced in operation 1 of FIG. 5A. Establishing the second PDU session using the first NodeB base station MgNB and the first UPF entity UPF1 may include establishing the second PDU session responsive to a second session establishment request received from the wireless terminal UE through the second NodeB base station SgNB as discussed above with respect to operation 13 of FIG. 4B as referenced in operation 2 of FIG. 5A. Releasing the second PDU session may include releasing the second PDU session responsive to a modification indication message received from the first NodeB base station MgNB at operation 4 of FIG. 5A. The modification indication message from the first NodeB base station MgNB may include an identification of the second NodeB base station SgNB for DC communication with the wireless terminal UE using the first and second NodeB base stations. Reestablishing the second PDU session may include reestablishing the second PDU session responsive to a third PDU session establishment request received from the wireless terminal UE through the second NodeB base station SgNB as discussed above with respect to operation 14 of FIG. 5C.

Moreover, establishing the first PDU session using the first NodeB base station MgNB and the first UPF entity UPF1 may include transmitting a first session management request to establish the first UPF entity UPF1 for the first PDU session responsive to the first session establishment request as discussed above with respect to operation 1 of FIG. 4A referenced in operation 1 of FIG. 5A. Establishing the second PDU session using the first NodeB base station MgNB and the first UPF entity UPF1 may include transmitting a second session management request to establish the first UPF entity UPF1 for the second PDU session responsive to the second session establishment request as discussed above with respect to operation 13 of FIG. 4B referenced in operation 2 of FIG. 5A. Releasing the second PDU session may include transmitting a third session management request to release the second PDU session as discussed above with respect to operation 5 of FIG. 5A responsive to the modification indication message received from the first NodeB base station MgNB. Reestablishing the second PDU session using the second NodeB base station SgNB and the second UPF entity UPF2 may include transmitting a fourth session management request to reestablish the second PDU session as discussed above with respect to operation 15 of FIG. 5C responsive to the third PDU session establishment request.

Operations of FIG. 10 may be used to provide the first and second PDU sessions using dual connectivity as discussed above with respect to FIGS. 6A-C. For example, establishing the second PDU session may include establishing the second PDU session responsive to receipt of a modification indication message from the first NodeB base station MgNB as discussed above with respect to operation 14 of FIG. 6B, with the modification indication message indicating a dual connectivity DC set up for the wireless terminal UE using the first NodeB base station MgNB and the second NodeB base station SgNB.

In addition, establishing the first PDU session using the first NodeB base station MgNB and the first UPF entity UPF1 may include establishing the first PDU session responsive to a first session establishment request received from the wireless terminal UE through the first NodeB base station MgNB as discussed above with respect to operation 1 of FIG. 6A. Establishing the second PDU session may include initiating transmission of a trigger PDU session establishment message to the wireless terminal UE as discussed above with respect to operation 16 of FIG. 6B, and establishing the second PDU session responsive to a second session establishment request received from the wireless terminal UE through the second NodeB base station SgNB after transmission of the trigger PDU session establishment message as discussed above with respect to operation 17 of FIG. 6C.

Establishing the first PDU session using the first NodeB base station MgNB and the first UPF entity UPF1 may include transmitting a first session management request to establish the first UPF entity UPF1 for the first PDU session responsive to the first session establishment request as discussed above with respect to operation 2 of FIG. 6A. Establishing the second PDU session using the second NodeB base station SgNB and the second UPF entity UPF2 may include transmitting a second session management request to establish the second UPF entity UPF2 for the second PDU session responsive to the second session establishment request as discussed above with respect to operation 18 of FIG. 6C.

Operations of a wireless communication network (including first and second NodeB base stations MgNB and SgNB and first and second UPF entities UPF1 and UPF 2) will now be discussed with reference to the flow chart of FIG. 11. For example, each NodeB base station may be implemented using the structure of FIG. 8 with modules stored in memory 805 so that the modules provide instructions so that when the instructions of a module are executed by processor 803, processor 803 performs respective operations; and each UPF entity may be implemented using the structure of FIG. 8 with modules stored in memory 805 so that the modules provide instructions so that when the instructions of a module are executed by processor 803, processor 803 performs respective operations. Processor 803 of a NodeB base station may thus transmit and/or receive communications to/from a wireless terminal through transceiver 801, and processor 803 may transmit and/or receive communications to/from other network nodes/entities through network interface 807.

According to some embodiments illustrated in FIG. 11, at block 1101, communication of a plurality of data frames may be provided for a wireless terminal UE using a first PDU session using the first NodeB base station MgNB and the first UPF entity UPF1 (e.g., using a first PDU session module). In addition, at block 1103, communication of the plurality of data frames for the wireless terminal UE may be provided using a second PDU session using the second NodeB base station SgNB and the second UPF entity UPF2 (e.g., using a second PDU session module). More particularly, the first and second PDU sessions may provide redundant data paths for communication of the plurality of data frames using dual connectivity DC for the wireless terminal UE. For example, the same plurality of uplink data frames from the wireless terminal UE may be transmitted in the uplink direction using the first PDU session through the first NodeB base station MgNB and the first UPF entity UPF1 and using the second PDU session through the second NodeB base station SgNB and the second UPF entity UPF2, or the same plurality of downlink data frames to the wireless terminal may be transmitted in the downlink direction using the first PDU session through the first NodeB base station MgNB and the first UPF entity UPF1 and using the second PDU session through the second NodeB base station SgNB and the second UPF entity UPF2.

Providing communication of the plurality of data frames using the first PDU session at block 1101 may include establishing the first PDU session responsive to receiving a first session establishment request for the first PDU session at the first NodeB base station MgNB from a core network and responsive to receiving a second session establishment request for the first PDU session at the first UPF entity UPF1 from the core network. The first session establishment request may be received at the first NodeB base station MgNB as discussed above, for example, with respect to operation 6 of FIG. 4A and/or 6A, and the second session establishment request may be received at the first UPF entity UPF1 as discussed above, for example, with respect to operation 3 of FIG. 4A and/or 6A. Establishing the first PDU session may further include transmitting a Radio Resource Configuration RRC reconfiguration message for the first PDU session from the first NodeB base station MgNB to the wireless terminal UE as discussed above with respect to operation 7 of FIG. 4A and/or 6A.

Operations of FIG. 11 may be used to provide communication using the first and second PDU sessions as discussed above with respect to FIGS. 4A-C. Providing communication of the plurality of data frames using the second PDU session may include establishing the second PDU session for the wireless terminal UE using the first NodeB base station MgNB and the first UPF entity UPF1 as discussed above with respect to FIG. 4B, and modifying the second PDU session for the wireless terminal UE to use the second NodeB and the second UPF entity UPF2 after establishing the second PDU session using the first NodeB base station MgNB and the first UPF entity UPF1 as discussed above with respect to FIG. 4C. Modifying the second PDU session may include transmitting a modification indication message from the first NodeB base station MgNB to a core network as discussed above with respect to operation 26 of FIG. 4C. Moreover, the modification indication message may include an identification of the second NodeB base station SgNB for DC communication with the wireless terminal UE.

Operations of FIG. 11 may be used to provide communication using the first and second PDU sessions as discussed above with respect to FIGS. 5A-C. Providing communication of the plurality of data frames using the second PDU session may include establishing the second PDU session for the wireless terminal UE using the first NodeB base station and the first UPF entity UPF1 as discussed above with respect to operation 2 of FIG. 5A. A modification indication message may be transmitted from the first NodeB base station MgNB to a core network to release the second PDU session as discussed above with respect to operation 4 of FIG. 5A, with the modification indication message including an identification of the second NodeB base station SgNB for DC communication with the wireless terminal UE. After releasing the second PDU session, the second PDU session may be reestablished using the second NodeB base station SgNB and the second UPF entity UPF2 as discussed above with respect to FIG. 5C.

Operations of FIG. 11 may be used to provide communication using the first and second PDU sessions as discussed above with respect to FIGS. 6A-C. Providing communication of the plurality of data frames using the second PDU session may include transmitting a modification indication message from the first NodeB base station MgNB to a core network as discussed above with respect to operation 14 of FIG. 6B, with the modification indication message indicating a dual connectivity setup for the wireless terminal UE using the first NodeB base station MgNB and the second NodeB base station SgNB. A trigger PDU session establishment message may be received at the first NodeB base station MgNB from the core network as discussed above with respect to operation 16 of FIG. 6B, and the trigger PDU session establishment message may be retransmitted from the first NodeB base station MgNB to the wireless terminal UE as discussed above with respect to operation 16 of FIG. 6B, with the trigger PDU session establishment message including an indication for the wireless terminal UE to initiate the second PDU session. A PDU session establishment request message for the second PDU session may be relayed from the wireless terminal UE through at least one of the first and/or second NodeB base stations to the core network as discussed above with respect to operation 17 of FIG. 6C. A session establishment request for the second PDU session may be received at the second UPF entity UPF2 from the core network after the PDU session establishment request message for the second PDU session as discussed above with respect to operation 19 of FIG. 6C.

Operations of a wireless terminal UE will now be discussed with reference to the flow chart of FIG. 18. For example, the wireless terminal UE may be implemented using the structure of FIG. 7 with modules stored in memory 705 so that the modules provide instructions so that when the instructions of a module are executed by processor 703, processor 703 performs respective operations. Processor 703 of wireless terminal UE may thus transmit and/or receive communications to/from one or more NodeB base stations of a wireless communication network through transceiver 701.

At block 1801, processor 703 may establish a first PDU session using first NodeB base station MgNB as discussed above with respect to operations 1 and 7 of FIG. 6A. Establishing the first PDU session, for example, may include establishing the first PDU session using a first RRC Reconfiguration as discussed above with respect to operation 7 of FIG. 6A.

At block 1803, processor 703 may receive a trigger PDU establishment message through the first NodeB base station MgNB of the wireless communication network and through transceiver 701 as discussed above with respect to operation 16 of FIG. 6B. The trigger PDU establishment message, for example, may be received as a non-Access Stratum, NAS, trigger PDU establishment message.

At block 1805, processor 703 may transmit a PDU session establishment request through transceiver 701 and second NodeB base station SgNB of the wireless communication network responsive to receiving the trigger PDU establishment message as discussed above with respect to operation 17 of FIG. 6C. The PDU session establishment request may be transmitted as a Non Access Stratum, NAS, PDU session establishment request.

After transmitting the PDU session establishment request, processor 703 may establish a second PDU session at block 1807 using the second NodeB base station SgNB of the wireless communication network so that the first and second PDU sessions are provided concurrently using dual connectivity DC to provide redundant data paths. Establishing the second PDU session may include establishing the second PDU session using a second RRC Reconfiguration as discussed above with respect to operation 23 of FIG. 6C.

At block 1809, processor 703 may provide communication of user data through transceiver 701 and the wireless communication network using the first and second PDU sessions using DC.

Figure 12:
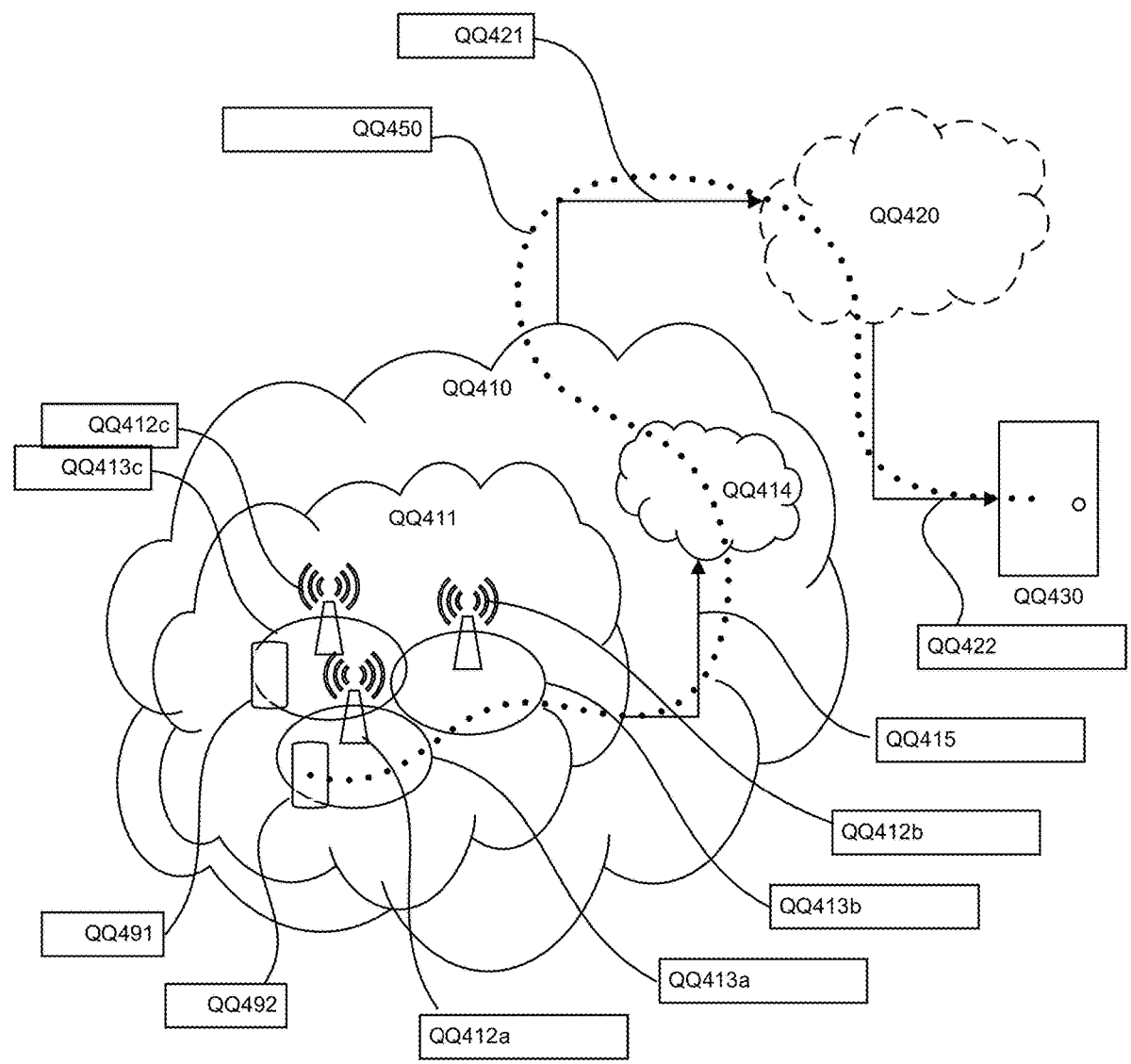
FIG. 12 is a schematic diagram illustrating a telecommunication network connected via an intermediate network to a host computer in accordance with some embodiments.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 13:
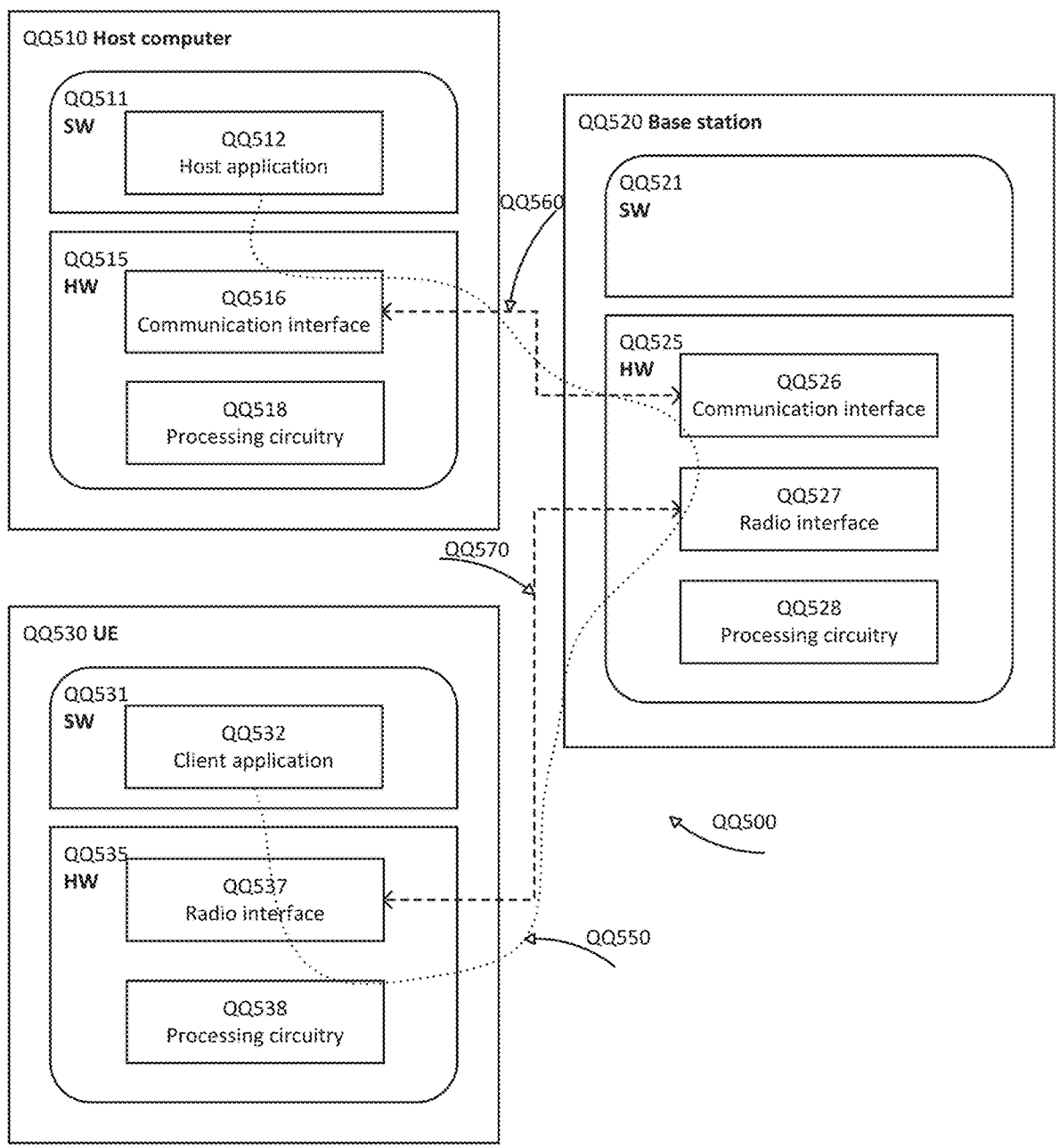
FIG. 13 is a block diagram illustrating a host computer communicating via a base station with a user equipment over a partially wireless connection in accordance with some embodiments.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
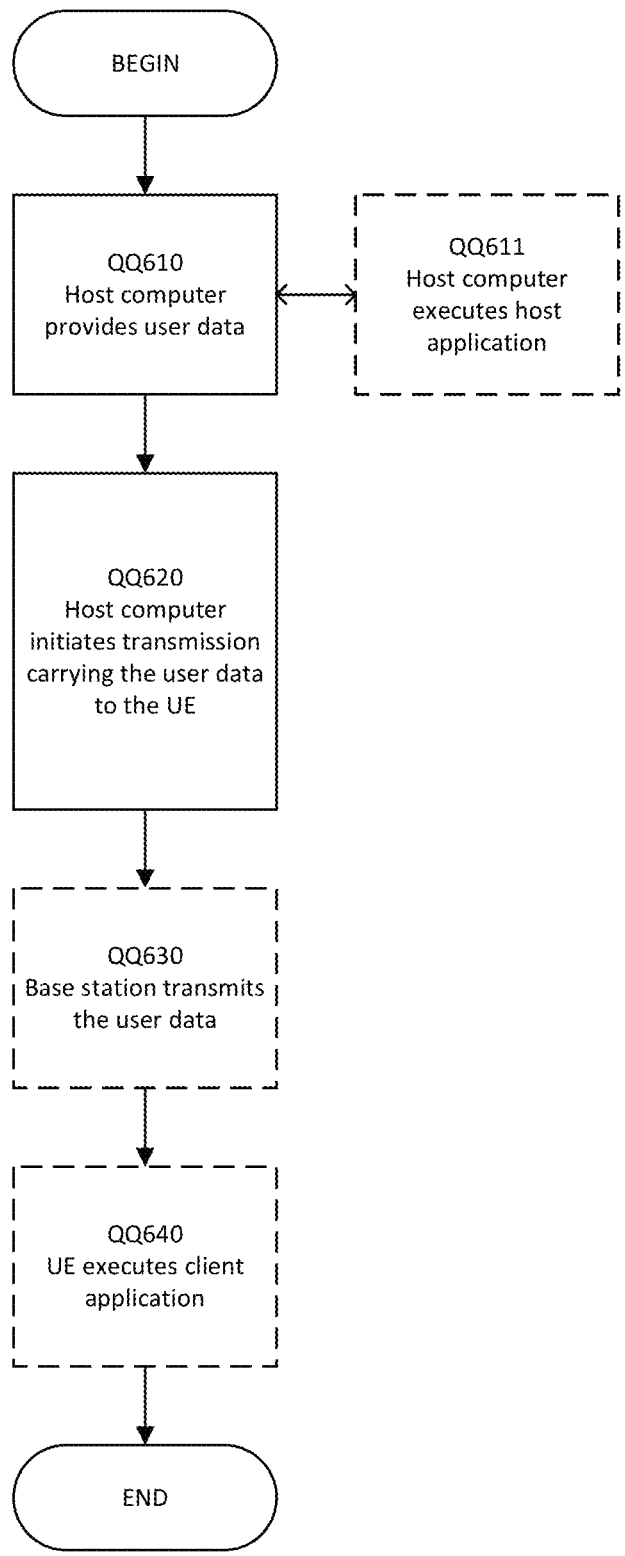
FIG. 14 is a flow chart illustrating methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
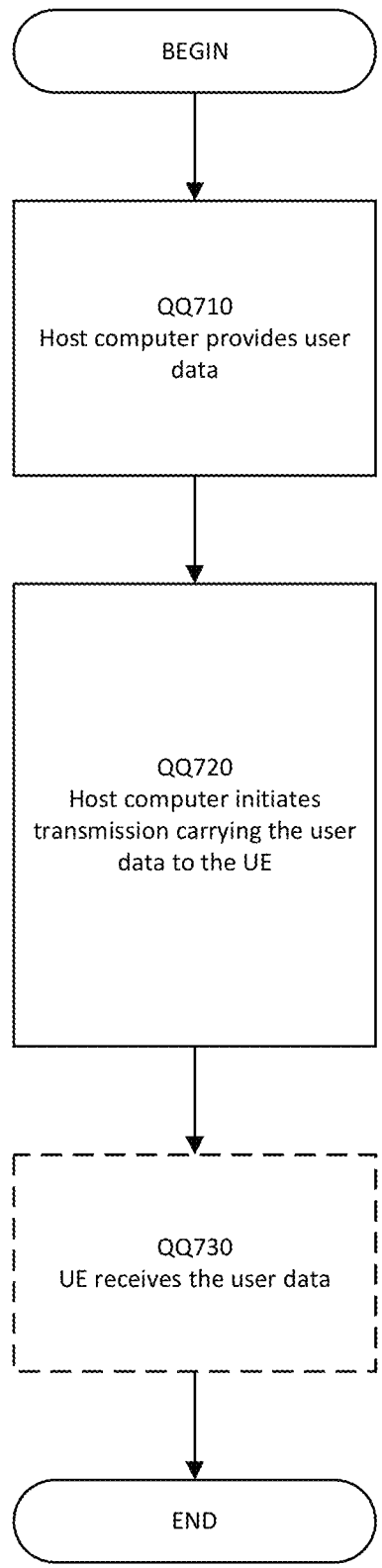
FIG. 15 is a flow chart illustrating methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
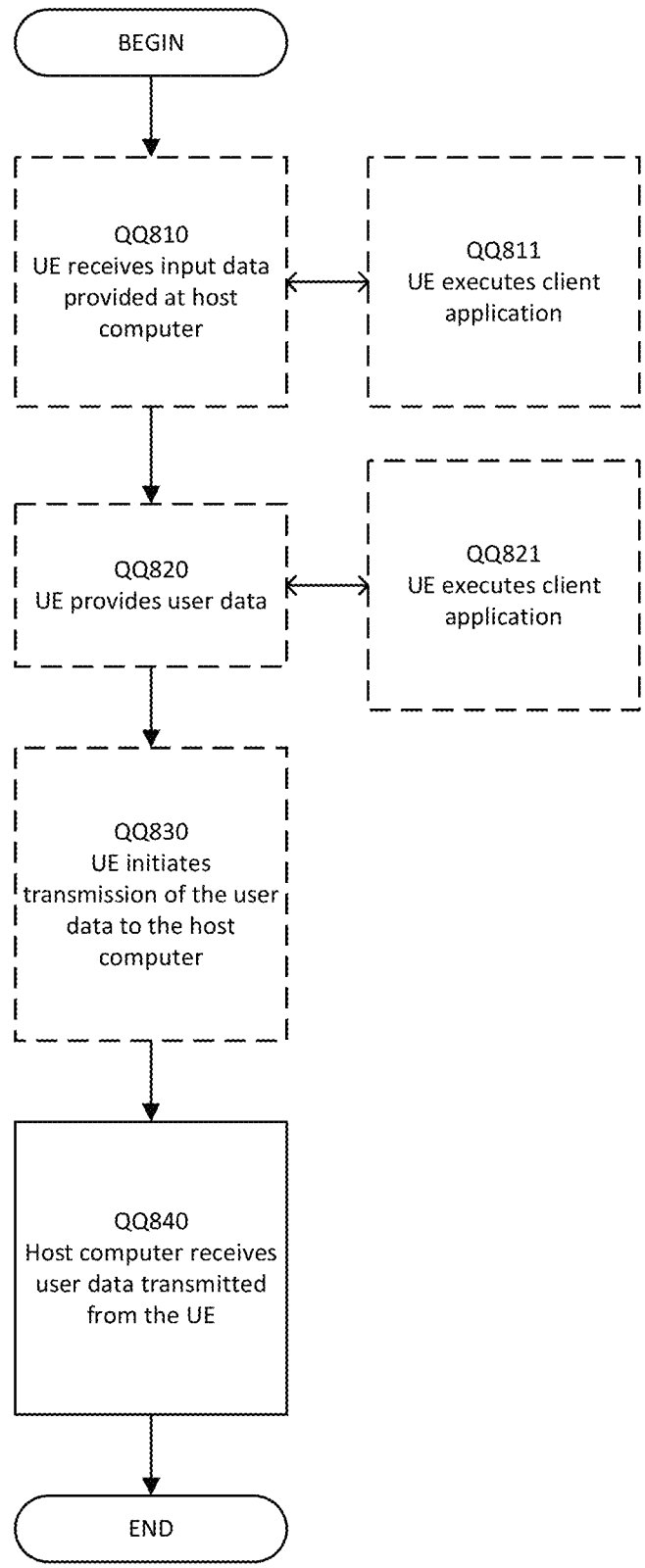
FIG. 16 is a flow chart illustrating methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
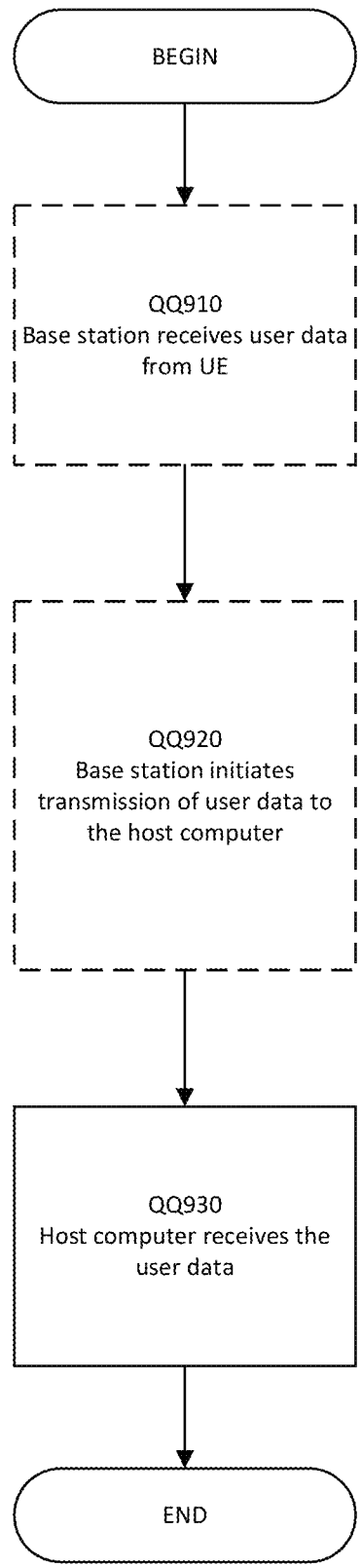
FIG. 17 is a flow chart illustrating methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Additional Embodiments are discussed below.

1. A communication system including a host computer comprising:
   processing circuitry configured to process user data; and
   a communication interface configured to provide communication of the user data through a wireless communication network for a wireless terminal (UE),
   wherein the wireless communication network comprises a network entity configured to,
   establish a first PDU session for the wireless terminal (UE) using a first NodeB base station (MgNB) and a first user plane function, UPF, entity (UPF1), and
   establish a second PDU session for the wireless terminal (UE) using a second NodeB base station (SgNB) and a second user plane function, UPF, entity (UPF1), wherein the first and second PDU sessions are established for the wireless terminal (UE) using the first and second NodeB base stations so that the first and second PDU sessions are provided concurrently using dual connectivity, DC, to provide redundant data paths for communication of the user data for the wireless terminal (UE) through the wireless communication network between the wireless terminal (UE) and the host computer.

2. The communication system of Embodiment 1, wherein establishing the second PDU session comprises establishing the second PDU session for the wireless terminal (UE) using the first NodeB base station (MgNB)

and the first UPF entity (UPF1), and modifying the second PDU session for the wireless terminal (UE) to use the second NodeB and the second UPF entity (UPF2) after establishing the second PDU session using the first NodeB base station (MgNB) and the first UPF entity (UPF1).

3. The communication system of Embodiment 2, wherein establishing the first PDU session using the first NodeB base station (MgNB) and the first UPF entity (UPF1) comprises establishing the first PDU session responsive to a first session establishment request received from the wireless terminal (UE) through the first NodeB base station (MgNB), wherein establishing the second PDU session using the first NodeB base station (MgNB) and the first UPF entity (UPF1) comprises establishing the second PDU session responsive to a second session establishment request received from the wireless terminal (UE) through the second NodeB base station (SgNB), wherein modifying the second PDU session comprises modifying the second PDU session responsive to a modification indication message received from the first NodeB base station (MgNB), and wherein the modification indication message from the first NodeB base station (MgNB) includes an identification of the second NodeB base station (SgNB) for DC communication with the wireless terminal (UE) using the first and second NodeB base stations.

4. The communication system of Embodiment 3, wherein establishing the first PDU session using the first NodeB base station (MgNB) and the first UPF entity (UPF1) comprises transmitting a first session management request to establish the first UPF entity (UPF1) for the first PDU session responsive to the first session establishment request, wherein establishing the second PDU session using the first NodeB base station (MgNB) and the first UPF entity (UPF1) comprises transmitting a second session management request to establish the first UPF entity (UPF1) for the second PDU session responsive to the second session establishment request, and wherein modifying the second PDU session comprises transmitting a third session management request to establish the second UPF entity (UPF2) for the second PDU session responsive to the modification indication message received from the first NodeB base station (MgNB).

5. The communication system of Embodiment 1, wherein establishing the second PDU session comprises establishing the second PDU session for the wireless terminal (UE) using the first NodeB base station (MgNB) and the first UPF entity (UPF1), releasing the second PDU session, and after releasing the second PDU session, reestablishing the second PDU session using the second NodeB base station (SgNB) and the second UPF entity (UPF2).

6. The communication system of Embodiment 5, wherein establishing the first PDU session using the first NodeB base station (MgNB) and the first UPF entity (UPF1) comprises establishing the first PDU session responsive to a first session establishment request received from the wireless terminal (UE) through the first NodeB base station (MgNB), wherein establishing the second PDU session using the first NodeB base station (MgNB) and the first UPF entity (UPF1) comprises establishing the second PDU session responsive to a second session establishment request received from the wireless terminal (UE) through the second NodeB base station (SgNB), wherein releasing the second PDU session comprises releasing the second PDU session responsive to a modification indication message received from the first NodeB base station (MgNB), wherein the modification indication message from the first NodeB base station (MgNB) includes an identification of the second NodeB base station (SgNB) for DC communication with the wireless terminal (UE) using the first and second NodeB base station (SgNB)s, and wherein reestablishing the second PDU session comprises reestablishing the second PDU session responsive to a third PDU session establishment request received from the wireless terminal (UE) through the second NodeB base station (SgNB).

7. The communication system of Embodiment 6, wherein establishing the first PDU session using the first NodeB base station (MgNB) and the first UPF entity (UPF1) comprises transmitting a first session management request to establish the first UPF entity (UPF1) for the first PDU session responsive to the first session establishment request, wherein establishing the second PDU session using the first NodeB base station (MgNB) and the first UPF entity (UPF1) comprises transmitting a second session management request to establish the first UPF entity (UPF1) for the second PDU session responsive to the second session establishment request, wherein releasing the second PDU session comprises transmitting a third session management request to release the second PDU session responsive to the modification indication message received from the first NodeB base station (MgNB), and wherein reestablishing the second PDU session using the second NodeB base station (SgNB) and the second UPF entity (UPF2) comprises transmitting a fourth session management request to reestablish the second PDU session responsive to the third PDU session establishment request.

8. The communication system of Embodiment 1, wherein establishing the second PDU session comprises establishing the second PDU session responsive to receipt of a modification indication message from the first NodeB base station (MgNB) indicating a dual connectivity set up for the wireless terminal (UE) using the first NodeB base station (MgNB) and the second NodeB base station (SgNB).

9. The communication system of Embodiment 8, wherein establishing the first PDU session using the first NodeB base station (MgNB) and the first UPF entity (UPF1) comprises establishing the first PDU session responsive to a first session establishment request received from the wireless terminal (UE) through the first NodeB base station (MgNB), and wherein establishing the second PDU session comprises initiating transmission of a trigger PDU session establishment message to the wireless terminal (UE) and establishing the second PDU session responsive to a second session establishment request received from the wireless terminal (UE) through the second NodeB base station (SgNB) after transmission of the trigger PDU session establishment message.

10. The communication system of Embodiment 9, wherein establishing the first PDU session using the first NodeB base station (MgNB) and the first UPF entity (UPF1) comprises transmitting a first session management request to establish the first UPF entity (UPF1) for the first PDU session responsive to the first session establishment request, and wherein establishing the second PDU session using the second NodeB base station (SgNB) and the second UPF entity (UPF2)

comprises transmitting a second session management request to establish the second UPF entity (UPF2) for the second PDU session responsive to the second session establishment request.
11. The communication system of any of Embodiments 1-10, wherein the network entity of the wireless communication network is an access and mobility function, AMF, entity of a core network, CN, of the wireless communication network, and wherein the first NodeB base station (MgNB) is a master gNB (MgNB) base station for the dual connectivity and the second NodeB base station (SgNB) is a secondary gNB (SgNB) base station for the dual connectivity.
12. A communication system including a host computer comprising:
processing circuitry configured to process user data; and
a communication interface configured to provide communication of the user data through a wireless communication network for a wireless terminal (UE),
wherein the wireless communication network comprises a first NodeB base station (MgNB), a second NodeB base station (SgNB), a first user plane function, UPF, entity (UPF1), and a second UPF entity (UPF2), wherein the wireless communication network is configured to,
provide communication of a plurality of data frames for a wireless terminal (UE) using a first PDU session using the first NodeB base station (MgNB) and the first UPF entity (UPF1), and
provide communication of the plurality of data frames for the wireless terminal (UE) using a second PDU session using the second NodeB base station (SgNB) and the second UPF entity (UPF2), so that the first and second PDU sessions provide redundant data paths for communication of the plurality of data frames using dual connectivity, DC, for the wireless terminal (UE) between the wireless terminal UE and the host computer.
13. The communication system of Embodiment 12, wherein providing communication of the plurality of data frames using the second PDU session comprises establishing the second PDU session for the wireless terminal (UE) using the first NodeB base station (MgNB) and the first UPF entity (UPF1), and modifying the second PDU session for the wireless terminal (UE) to use the second NodeB and the second UPF entity (UPF2) after establishing the second PDU session using the first NodeB base station (MgNB) and the first UPF entity (UPF1), wherein modifying the second PDU session comprises transmitting a modification indication message from the first NodeB base station (MgNB) to a core network, and wherein the modification indication message includes an identification of the second NodeB base station (SgNB) for DC communication with the wireless terminal (UE).
14. The wireless communication network of Embodiment 12, wherein providing communication of the plurality of data frames using the second PDU session comprises establishing the second PDU session for the wireless terminal (UE) using the first NodeB based station and the first UPF entity (UPF1), transmitting a modification indication message from the first NodeB base station (MgNB) to a core network to release the second PDU session wherein the modification indication message includes an identification of the second NodeB base station (SgNB) for DC communication with the wireless terminal (UE), and after releasing the second PDU session, reestablishing the second PDU session using the second NodeB base station (SgNB) and the second UPF entity (UPF2).
15. The communication system of Embodiment 12, wherein providing communication of the plurality of data frames using the second PDU session comprises transmitting a modification indication message from the first NodeB base station (MgNB) to a core network wherein the modification indication message indicates a dual connectivity setup for the wireless terminal (UE) using the first NodeB base station (MgNB) and the second NodeB base station (SgNB), receiving a trigger PDU session establishment message at the first NodeB base station (MgNB) from the core network, retransmitting the trigger PDU session establishment message from the first NodeB base station (MgNB) to the wireless terminal (UE) wherein the trigger PDU session establishment message includes an indication for the wireless terminal (UE) to initiate the second PDU session, and relaying a PDU session establishment request message for the second PDU session from the wireless terminal (UE) through at least one of the first and/or second NodeB base stations to the core network, and receiving a session establishment request for the second PDU session at the second UPF entity (UPF2) from the core network after the PDU session establishment request message for the second PDU session.
16. The communication system of any of Embodiments 12-15 wherein providing communication of the plurality of data frames using the first PDU session comprises establishing the first PDU session responsive to receiving a first session establishment request for the first PDU session at the first NodeB base station (MgNB) from a core network and responsive to receiving a second session establishment request for the first PDU session at the first UPF entity (UPF1) from the core network, and wherein establishing the first PDU session further comprises transmitting a Radio Resource Configuration, RRC, reconfiguration message for the first PDU session from the first NodeB base station (MgNB) to the wireless terminal (UE).
17. The communication system of any of Embodiments 12-16, wherein the first NodeB base station (MgNB) is a master gNB (MgNB) base station for the dual connectivity, and wherein the second NodeB base station (SgNB) is a secondary gNB (SgNB) base station for the dual connectivity.
18. A method of operating a wireless terminal (UE) it a wireless communication network, the method comprising:
establishing (1801) a first PDU session using a first NodeB base station (MgNB);
receiving (1803) a trigger PDU establishment message through the first NodeB base station (MgNB) of the wireless communication network;
responsive to receiving the trigger PDU establishment message, transmitting (1805) a PDU session establishment request through a second NodeB base station (SgNB) of the wireless communication network; and
after transmitting the PDU session establishment request, establishing (1807) a second PDU session using the second NodeB base station (SgNB) of the wireless communication network so that the first and second PDU sessions are provided concurrently using dual connectivity, DC, to provide redundant data paths; and providing (1809) communication of user data through the wireless communication network using the first and second PDU sessions.

19. The method of Embodiment 18, wherein the establishing the first PDU session comprises establishing the first PDU session using a first RRC Reconfiguration.

20. The method of any of Embodiments 18-19, wherein establishing the second PDU session comprises establishing the second PDU session using a second RRC Reconfiguration.

21. The method of any of Embodiments 18-20, wherein the trigger PDU establishment message is received as a Network Access Stratum, NAS, trigger PDU establishment message.

22. The method of any of Embodiments 18-21, wherein the PDU session establishment request is transmitted as a Network Access Stratum, NAS, PDU session establishment request.

23. A communication system including a host computer comprising:

processing circuitry configured to process user data; and a communication interface configured to provide communication of the user data through a wireless communication network for a wireless terminal (UE), wherein the wireless terminal (UE) comprises a radio interface and processing circuitry configure to, establish a first PDU session using a first NodeB base station (MgNB), receive a trigger PDU establishment message through the first NodeB base station (MgNB) of the wireless communication network, responsive to receiving the trigger PDU establishment message, transmit a PDU session establishment request through a second NodeB base station (SgNB) of the wireless communication network, and after transmitting the PDU session establishment request, establish a second PDU session using the second NodeB base station (SgNB) of the wireless communication network so that the first and second PDU sessions are provided concurrently using dual connectivity, DC, to provide redundant data paths, and provide communication of user data through the wireless communication network using the first and second PDU sessions.

24. The method of Embodiment 23, wherein the establishing the first PDU session comprises establishing the first PDU session using a first RRC Reconfiguration.

25. The method of any of Embodiments 23-24, wherein establishing the second PDU session comprises establishing the second PDU session using a second RRC Reconfiguration.

26. The method of any of Embodiments 23-25, wherein the trigger PDU establishment message is received as a Network Access Stratum, NAS, trigger PDU establishment message.

27. The method of any of Embodiments 23-26, wherein the PDU session establishment request is transmitted as a Network Access Stratum, NAS, PDU session establishment request.

Explanations of various abbreviations used herein are discussed below.

| Abbreviation | Explanation |
| --- | --- |
| AMF | Access and Mobility management Function |
| AS | Application Server |
| BS | Base Station |
| C-MTC | Critical Machine Type Communication |
| DC | Dual Connectivity |
| DNN | Data Network Name |
| DPI | Deep Packet Inspection |
| EPC | Evolved Packet Core |
| gNB | NR Node B |
| LTE | Long Term Evolution |
| MgNB | Master gNB |
| OTA | Over The Air |
| PDCP | Packet Data Convergence Protocol |
| RAN | Radio Access Network |
| SgNB | Secondary gNB |
| SMF | Session Management Function |
| SW | Switch |
| TSN | Time-Sensitive Networking |
| UDM | User Data Management |
| UE | User Equipment |
| UPF | User Plane Function |

Various references are mentioned above, and these references are identified below:

[1] IEEE Time-Sensitive Networking Task Group, http://www.ieee802.org/1/pages/tsn.html, last modified 3 May 2017.

[2] International PCT Publication WO 2017/137075 entitled "Industry Automation Apparatus With Redundant Connectivity To A Communication Network And Controllers Therefor," to Gyorgy Miklos, et al.

[3] International PCT Application No. PCT/IB2017/052739, to Janos Harmatos, et al.

[4] International PCT Application No. PCT/EP2016/064214, to Gyorgy Miklos, et al.

[5] 3GPP TS 36.300 V14.4.0, Evolved Universal Terrestrial Radio Access (E-UTRA) and Evolved Universal Terrestrial Radio Access Network (E-UTRAN); Overall description; Stage 2, 2017-09.

[6] 3GPP TS 38.300 V2.0.0, "NR; NR and NG-RAN Overall Description; Stage 2," 2017-12.

[7] 3GPP TS 38.300 V2.0.0, NR; NR and NG-RAN Overall Description; Stage 2, Section 6.4.2, 2017-12.

[8] 3GPP TS 23.501 V2.0.1, System Architecture for the 5G System; Stage 2, 2017-12.

[9] 3GPP TS 23.502 V2.0.0, Procedures for the 5G System; Stage 2, 2017-12.

[10] IETF DetNet activity, https://datatracker.ietf.org/wg/detnet/about/, Version 6.67.1p1, 12-14-2017.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless terminal, UE, in a wireless communication network, the method comprising:
   providing information to the wireless communication network that at least two protocol data unit, PDU, sessions established or to be established for the UE are to be handled redundantly via dual connectivity, DC, wherein the information is encoded into a data network name, DNN, and includes an indication of a plurality of the at least two PDU sessions;
   triggering establishment of the at least two PDU sessions for the UE; and
   wherein one of the at least two PDU sessions is established via a first NodeB base station in a radio access network, RAN, of the wireless communication network and a first user plane function, UPF, entity, and another one of the at least two PDU sessions is established via a second NodeB base station in the RAN of the wireless communication network and a second UPF entity.

2. The method of claim 1, wherein the information that the at least two PDU sessions are to be handled redundantly via DC is provided to the first NodeB base station, particularly a master base station, MgNB.

3. The method of claim 1, wherein the information that the at least two PDU sessions are to be handled redundantly via DC is provided to a core network node of the wireless communication network, particularly to an access and mobility management function, AMF and/or a session management function, SMF.

4. The method of claim 1, wherein the information that the at least two PDU sessions are to be handled redundantly via DC is provided in a PDU session establishment request.

5. The method of claim 4, wherein the PDU session establishment request is transmitted as a Network Access Stratum, NAS, PDU session establishment request.

6. The method of claim 1, further comprising providing an indication of a group of PDU sessions to be handled redundantly.

7. The method of claim 1, further comprising:
establishing a first PDU session using a first NodeB base station of the wireless communication network;
receiving a trigger PDU establishment message through the first NodeB base station;
responsive to receiving the trigger PDU establishment message, transmitting a PDU session establishment request through a second NodeB base station of the wireless communication network; and
after transmitting the PDU session establishment request, establishing a second PDU session using the second NodeB base station so that the first PDU session and the second PDU session are provided concurrently using DC to provide redundant data paths.

8. The method of claim 7, wherein establishing the first PDU session comprises establishing the first PDU session using a first radio resource control, RRC, reconfiguration, and/or wherein establishing the second PDU session comprises establishing the second PDU session using a second RRC reconfiguration.

9. The method of claim 1, further comprising providing communication of user data through the wireless communication network using the at least two PDU sessions.

10. A wireless user equipment, UE, for use in a wireless communication network, the UE comprising:
processing circuitry; and
memory coupled with the processing circuitry, wherein the memory includes instructions that when executed by the processing circuitry causes the UE to perform operations comprising:
provide information to the wireless communication network that at least two protocol data unit, PDU, sessions established or to be established for the UE are to be handled redundantly via dual connectivity, DC, wherein the information is encoded into a data network name, DNN, and includes an indication of a plurality of the at least two PDU sessions; and
trigger, or receive a trigger for, establishment of the at least two PDU sessions for the UE;
wherein one of the at least two PDU sessions is established via a first NodeB base station in a radio access network, RAN, of the wireless communication network and a first user plane function, UPF, entity, and another one of the at least two PDU sessions is established via a second NodeB base station in the RAN of the wireless communication network and a second user plane function, UPF, entity.

11. The UE of claim 10, wherein the memory includes further instructions that when executed by the processing circuitry causes the UE to perform further operations comprising providing an indication of a group of PDU sessions to be handled redundantly.

12. The UE of claim 10, wherein the memory includes further instructions that when executed by the processing circuitry causes the UE to perform further operations comprising:
establishing a first PDU session using a first NodeB base station of the wireless communication network;
receiving a trigger PDU establishment message through the first NodeB base station;
responsive to receiving the trigger PDU establishment message, transmitting a PDU session establishment request through a second NodeB base station of the wireless communication network; and
after transmitting the PDU session establishment request, establishing a second PDU session using the second NodeB base station so that the first and second PDU sessions are provided concurrently using DC to provide redundant data paths.

13. A computer program product comprising a non-transitory storage medium including program code to be executed by processing circuitry of a user equipment, UE, in a wireless communication network, whereby execution of the program code causes the UE to perform operations comprising:
providing information to the wireless communication network that at least two protocol data unit, PDU, sessions established or to be established for the UE are to be handled redundantly via dual connectivity, DC, wherein the information is encoded into a data network name, DNN, and includes an indication of a plurality of the at least two PDU sessions;
triggering establishment of the at least two PDU sessions for the UE; and
wherein one of the at least two PDU sessions is established via a first NodeB base station in a radio access network, RAN, of the wireless communication network and a first user plane function, UPF, entity, and another one of the at least two PDU sessions is established via a second NodeB base station in the RAN of the wireless communication network and a second UPF entity.

14. The computer program product of claim 13, wherein the information that the at least two PDU sessions are to be handled redundantly via DC is provided to at least one of:
the first NodeB base station, particularly a master base station, MgNB and
a core network node of the wireless communication network, particularly to an access and mobility management function, AMF and/or a session management function, SMF.

15. The computer program product of claim 13, wherein the non-transitory storage medium includes further program code to be executed by processing circuitry of the UE, whereby execution of the further program code causes the UE to perform further operations comprising:
establishing a first PDU session using a first NodeB base station of the wireless communication network;
receiving a trigger PDU establishment message through the first NodeB base station;
responsive to receiving the trigger PDU establishment message, transmitting a PDU session establishment request through a second NodeB base station of the wireless communication network; and
after transmitting the PDU session establishment request, establishing a second PDU session using the second NodeB base station so that the first and second PDU sessions are provided concurrently using DC to provide redundant data paths.

16. The method of claim 1, further comprising providing redundancy sequence numbers, RSNs, for the at least two PDU sessions indicating DC is to be provided for the at least two PDU sessions.

17. The UE of claim 10, wherein the memory includes further instructions that when executed by the processing circuitry causes the UE to perform further operations comprising providing redundancy sequence numbers, RSNs, for the at least two PDU sessions indicating DC is to be provided for the at least two PDU sessions.

18. The computer program product of claim 13, wherein the non-transitory storage medium includes further program code to be executed by processing circuitry of the UE, whereby execution of the further program code causes the UE to perform further operations comprising providing redundancy sequence numbers, RSNs, for the at least two PDU sessions indicating DC is to be provided for the at least two PDU sessions.

19. The method of claim 1, wherein triggering establishment of the at least two PDU sessions is based on a configuration of the UE indicating a need for redundancy.

20. The UE of claim 10, wherein triggering, or receiving a trigger for, establishment of the at least two PDU sessions is based on a configuration of the UE indicating a need for redundancy.

\* \* \* \* \*

UNITED STATES PATENT AND TRADEMARK OFFICE
CERTIFICATE OF CORRECTION

PATENT NO. : 12,144,045 B2  
APPLICATION NO. : 17/895332  
DATED : November 12, 2024  
INVENTOR(S) : Miklós et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 2, Line 26, delete "(detnet),"" and insert -- (DetNet)," --, therefor.

In the Specification

In Column 1, Line 10, delete "2020," and insert -- 2020, now U.S. Pat. No. 11,477,833, --, therefor.

In Column 10, Lines 9-10, delete "for one PDU session for another PDU session." and insert -- for another PDU session). --, therefor.

In Column 14, Line 56, delete "Mobility" and insert -- Mobility Management --, therefor.

In Column 17, Line 47, delete "UPF 2)" and insert -- UPF2) --, therefor.

In Column 23, Line 6, delete "QQ510's" and insert -- QQ510 --, therefor.

In Column 23, Line 65, delete "substep QQ830" and insert -- step QQ830 --, therefor.

In Column 24, Line 38, delete "according" and insert -- according to --, therefor.

In Column 24, Line 48, delete "to," and insert -- to: --, therefor.

In Column 27, Line 7, delete "mobility" and insert -- mobility management --, therefor.

In Column 27, Line 25, delete "to," and insert -- to: --, therefor.

Signed and Sealed this  
Seventh Day of October, 2025

John A. Squires  
*Director of the United States Patent and Trademark Office*

In Column 27, Line 60, delete "based" and insert -- base --, therefor.

In Column 29, Line 30, delete "configure to," and insert -- configured to: --, therefor.